US012598442B2

(12) United States Patent
Celestinos Arroyo

(10) Patent No.: US 12,598,442 B2
(45) Date of Patent: Apr. 7, 2026

(54) AUTOMATIC LOUDSPEAKER DIRECTIVITY ADAPTATION

(71) Applicant: SAMSUNG ELECTRONICS CO., LTD., Suwon-si (KR)

(72) Inventor: Adrian Celestinos Arroyo, Porter Ranch, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/152,065

(22) Filed: Jan. 9, 2023

(65) Prior Publication Data

US 2024/0236597 A1 Jul. 11, 2024

(51) Int. Cl.

| | |
|---|---|
| ***H04S 7/00*** | (2006.01) |
| ***H04R 5/02*** | (2006.01) |
| ***H04R 5/027*** | (2006.01) |
| ***H04R 5/04*** | (2006.01) |
| ***H04S 3/00*** | (2006.01) |

(52) U.S. Cl.

CPC .............. *H04S 7/301* (2013.01); *H04R 5/02* (2013.01); *H04R 5/027* (2013.01); *H04R 5/04* (2013.01); *H04S 3/008* (2013.01); *H04S 7/302* (2013.01); *H04S 7/305* (2013.01); *H04S 2400/01* (2013.01); *H04S 2400/15* (2013.01)

(58) Field of Classification Search

None

See application file for complete search history.

(56) References Cited

U.S. PATENT DOCUMENTS

| | | | |
|---|---|---|---|
| 7,860,260 B2 | 12/2010 | Sun-Min et al. | |
| 9,900,723 B1 | 2/2018 | Choisel et al. | |
| 10,021,506 B2 * | 7/2018 | Johnson | H04S 7/305 |
| 10,313,789 B2 | 6/2019 | Yury | |
| 10,820,097 B2 | 10/2020 | Tsingos et al. | |

(Continued)

FOREIGN PATENT DOCUMENTS

| | | |
|---|---|---|
| CN | 114143696 A | 3/2022 |
| KR | 10-1118214 B1 | 3/2012 |

(Continued)

OTHER PUBLICATIONS

International Search Report and Written Opinion dated Oct. 4, 2023 for International Application PCT/KR2023/006692, from Korean Intellectual Property Office, pp. 1-10, Republic of Korea.

(Continued)

*Primary Examiner* — Walter F Briney, III

(74) *Attorney, Agent, or Firm* — Kenneth L. Sherman; Steven Laut; Sherman IP LLP

(57) ABSTRACT

One embodiment provides a method of automatic loudspeaker directivity adaptation. The method comprises measuring one or more room impulse responses (RIRs) from one or more loudspeakers to one or more microphones of the one or more loudspeakers, estimating reverberation time and clarity based on the one or more RIRs, and estimating one or more positions of the one or more loudspeakers based on the one or more RIRs. The method further comprises automatically adapting directivity of the one or more loudspeakers based on the reverberation time estimated, the clarity estimated, and the one or more positions estimated.

20 Claims, 20 Drawing Sheets

(56) References Cited

U.S. PATENT DOCUMENTS

| | | | | |
|---|---|---|---|---|
| 11,184,725 | B2 | 11/2021 | Arroyo | |
| 11,304,017 | B2 | 4/2022 | Parvaix et al. | |
| 11,350,232 | B1 | 5/2022 | Robinson et al. | |
| 2008/0144864 | A1 | 6/2008 | Huon | |
| 2010/0157740 | A1* | 6/2010 | Ko | H04R 3/12 367/138 |
| 2011/0060599 | A1 | 3/2011 | Kim et al. | |
| 2011/0317522 | A1 | 12/2011 | Florencio et al. | |
| 2015/0358756 | A1 | 12/2015 | Harma et al. | |
| 2016/0021458 | A1 | 1/2016 | Johnson et al. | |
| 2019/0069119 | A1* | 2/2019 | Holman | H04R 3/12 |
| 2020/0112807 | A1 | 4/2020 | Celestinos Arroyo | |
| 2020/0381007 | A1 | 12/2020 | Hur | |
| 2021/0116555 | A1* | 4/2021 | Zaccá | G01S 7/539 |
| 2021/0144476 | A1 | 5/2021 | Toguri | |
| 2021/0219087 | A1 | 7/2021 | Unno et al. | |
| 2021/0258714 | A1 | 8/2021 | Watanabe et al. | |
| 2023/0104111 | A1* | 4/2023 | Murgai | H04S 7/304 381/303 |
| 2023/0209297 | A1 | 6/2023 | Li et al. | |
| 2024/0055012 | A1* | 2/2024 | Wang | G10L 21/0208 |

FOREIGN PATENT DOCUMENTS

| | | | |
|---|---|---|---|
| KR | 10-20170142001 | A | 12/2017 |
| WO | 18064410 | A1 | 4/2018 |
| WO | 22120005 | A1 | 6/2022 |

OTHER PUBLICATIONS

Extended European Search Report dated Oct. 10, 2025 for European Patent Application No. 23916367.8, from European Patent Office, pp. 1-7, Germany.

Corrected Extended European Search Report dated Oct. 16, 2025 for European Patent Application No. 23916367.8, from European Patent Office, pp. 1-3, Germany.

* cited by examiner

100

AUTOMATIC LOUDSPEAKER DIRECTIVITY ADAPTATION

TECHNICAL FIELD

One or more embodiments generally relate to loudspeaker systems, in particular, a method and system of automatic loudspeaker directivity adaptation.

BACKGROUND

Conventional multichannel sound reproduction or loudspeaker systems are designed according to standards, such as a standard for multichannel sound technology in home and broadcasting applications defined in the International Telecommunication Union (ITU) Report BS.2159-4 ("ITU standard"). Such systems are used to reproduce/playback multichannel content such as music, movies, or broadcast programs that are produced and recorded in accordance with the same standards.

SUMMARY

One embodiment provides a method of automatic loudspeaker directivity adaptation. The method comprises measuring one or more room impulse responses (RIRs) from one or more loudspeakers to one or more microphones of the one or more loudspeakers, estimating reverberation time and clarity based on the one or more RIRs, and estimating one or more positions of the one or more loudspeakers based on the one or more RIRs. The method further comprises automatically adapting directivity of the one or more loudspeakers based on the reverberation time estimated, the clarity estimated, and the one or more positions estimated.

Another embodiment provides a system of automatic loudspeaker directivity adaptation. The system comprises at least one processor and a non-transitory processor-readable memory device storing instructions that when executed by the at least one processor causes the at least one processor to perform operations. The operations include measuring one or more RIRs from one or more loudspeakers to one or more microphones of the one or more loudspeakers, estimating reverberation time and clarity based on the one or more RIRs, and estimating one or more positions of the one or more loudspeakers based on the one or more RIRs. The operations further include automatically adapting directivity of the one or more loudspeakers based on the reverberation time estimated, the clarity estimated, and the one or more positions estimated.

One embodiment provides a non-transitory processor-readable medium that includes a program that when executed by a processor performs a method of automatic loudspeaker directivity adaptation. The method comprises measuring one or more RIRs from one or more loudspeakers to one or more microphones of the one or more loudspeakers, estimating reverberation time and clarity based on the one or more RIRs, and estimating one or more positions of the one or more loudspeakers based on the one or more RIRs. The method further comprises automatically adapting directivity of the one or more loudspeakers based on the reverberation time estimated, the clarity estimated, and the one or more positions estimated.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
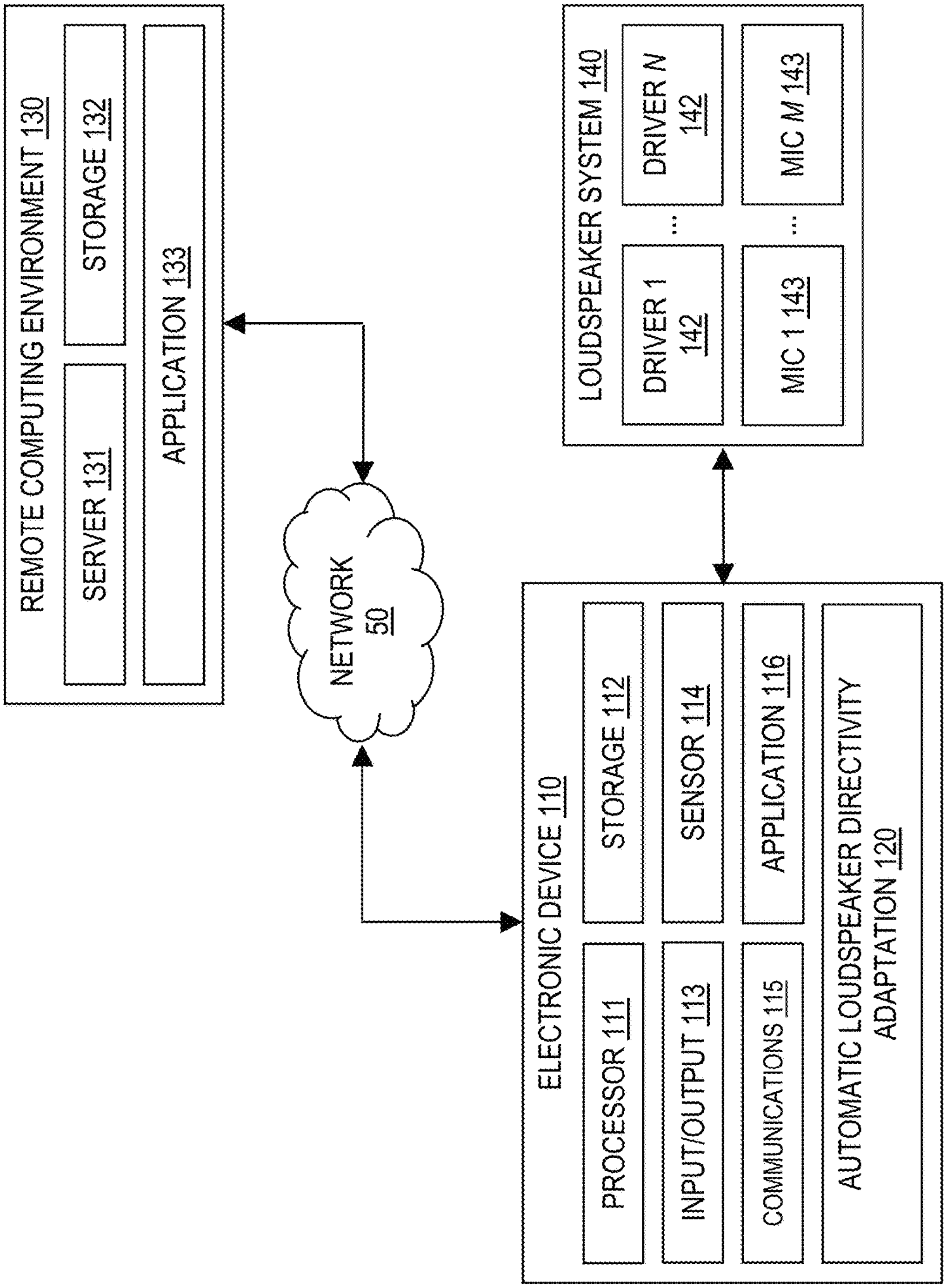
FIG. 1 is an example computing architecture for implementing automatic loudspeaker directivity adaptation, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to loudspeaker systems, in particular, a method and system of automatic loudspeaker directivity adaptation. One embodiment provides a method of automatic loudspeaker directivity adaptation. The method comprises measuring one or more room impulse responses (RIRs) from one or more loudspeakers to one or more microphones of the one or more loudspeakers, estimating reverberation time and clarity based on the one or more RIRs, and estimating one or more positions of the one or more loudspeakers based on the one or more RIRs. The method further comprises automatically adapting directivity of the one or more loudspeakers based on the reverberation time estimated, the clarity estimated, and the one or more positions estimated.

Another embodiment provides a system of automatic loudspeaker directivity adaptation. The system comprises at least one processor and a non-transitory processor-readable memory device storing instructions that when executed by the at least one processor causes the at least one processor to perform operations. The operations include measuring one or more RIRs from one or more loudspeakers to one or more microphones of the one or more loudspeakers, estimating reverberation time and clarity based on the one or more RIRs, and estimating one or more positions of the one or more loudspeakers based on the one or more RIRs. The operations further include automatically adapting directivity of the one or more loudspeakers based on the reverberation time estimated, the clarity estimated, and the one or more positions estimated.

One embodiment provides a non-transitory processor-readable medium that includes a program that when executed by a processor performs a method of automatic loudspeaker directivity adaptation. The method comprises measuring one or more RIRs from one or more loudspeakers to one or more microphones of the one or more loudspeakers, estimating reverberation time and clarity based on the one or more RIRs, and estimating one or more positions of the one or more loudspeakers based on the one or more RIRs. The method further comprises automatically adapting directivity of the one or more loudspeakers based on the reverberation time estimated, the clarity estimated, and the one or more positions estimated.

Reverberation time is a room acoustics parameter representing a duration (i.e., an amount of time) required for space-averaged density of acoustic energy in a room (or any other space) to decrease by a pre-determined amount of decibels (dB) (e.g., 60 dB) after a source (e.g., a loudspeaker) has stopped emitting the energy.

Let RT generally denote reverberation time expressed in seconds (s). $RT_{60}$ denotes reverberation time required for space-averaged density of acoustic energy in a room to decrease by 60 dB after a source has stopped emitting the energy.

Reverberation time can be evaluated based on a smaller dynamic range than 60 dB and extrapolated to a decay time of 60 dB. For example, $RT_{20}$ is reverberation time based on a duration at which an acoustic energy decay curve reaches 5 dB and 25 dB (i.e., decay values of 5 dB to 25 dB). As another example, $RT_{30}$ is reverberation time based on decay values of 5 dB to 35 dB.

Clarity is a room acoustics parameter quantifying clarity of sound perceived by a listener in a room (or any other space). Specifically, clarity quantifies an early-to-late ratio of acoustic energy arriving at the listener.

Let C generally denote clarity expressed in dB. A higher clarity indicates better sound quality (i.e., sound will be perceived more clearly by a listener).

Clarity may be calculated based on an early time limit of either 50 ms or 80 ms, depending on whether an acoustic environment is intended for a particular content type (e.g., speech, music, etc.) of audio to be reproduced. For example, $C_{80}$ is clarity based on an early time limit of 80 ms. $C_{80}$ is determined in accordance with equation (1) provided below:

$$C_{80} = 10\log 10 \frac{\int_{0}^{80\ ms} p^2(t)dt}{\int_{80\ ms}^{\infty} p^2(t)dt}, \tag{1}$$

wherein p(t) is an instantaneous sound pressure of an impulse response measured at a measurement point.

As another example, $C_{50}$ is clarity based on an early time limit of 50 ms. $C_{50}$ is determined in accordance with equation (2) provided below:

$$c_{50} = 10\log 10 \frac{\int_{0}^{50\ ms} p^2(t)dt}{\int_{50\ ms}^{\infty} p^2(t)dt}. \tag{2}$$

A multichannel audio loudspeaker system typically includes at least two loudspeakers distributed within a room. The acoustics of the room play an important role in a listener's perceived sound quality. One or more additional driver units may be included in the loudspeaker system to direct sound to a ceiling or one or more other surfaces of the room. For a multichannel audio loudspeaker system, the ITU-R BS.1116-3 standard recommends an average $$RT = 0.25\left(\frac{V}{V_0}\right)^{\frac{1}{3}},$$

where V is a room volume of a room the system is placed in, $V_0$ is a reference room volume, and $V_0$=100 $m^3$. Acoustics of different rooms vary. For example, a living room may have a higher reverberation time than a bedroom. As reverberation times of acoustic environments may vary, an estimation of reverberation time in a room (or any other space) is needed.

One or more embodiments provide a framework for automatically adapting directivity of one or more loudspeakers of a loudspeaker system. In one embodiment, one or more room acoustic parameters of a room the system is placed in are determined, such as reverberation time and clarity. The directivity of the loudspeakers are controlled based on the one or more acoustic parameters. For example, acoustic energy reproduced by the loudspeakers may be towards directed a ceiling of the room, a floor of the room, one or more walls of the room, and/or a listener in the room.

In one embodiment, for a loudspeaker of the system with adaptive directivity for multichannel audio reproduction, loudspeaker position information indicative of a position of the loudspeaker in the room is determined. For example, the loudspeaker position information comprises a distance from the loudspeaker to a nearest boundary (e.g., wall, floor, ceiling) of the room, and an orientation of the loudspeaker relative to the nearest boundary. Based on reverberation time, clarity, and the loudspeaker position information, directivity of the loudspeaker is automatically adapted/adjusted, such that acoustic energy reproduced by the loudspeaker may be directed to the ceiling, the floor, the walls, or the listener for different application purposes (e.g., in accordance with listener preferences derived from listening tests and/or content type of audio reproduced).

For example, an acoustic environment of the room may be dry or dead if the reverberation time is short. If the acoustic environment is dry, sound in the room is less immersive and is perceived with lack of envelopment. In one embodiment, if the acoustic environment is dry, directivity of at least one loudspeaker of the system is automatically adapted/adjusted to direct more acoustic energy towards the walls and the ceiling, thereby improving sound's sense of immersion and perceived envelopment in the room.

As another example, the acoustic environment of the room may be live if the reverberation time is long. If the acoustic environment is live, sound in the room is less clear and less defined. In particular, any sound comprising human voices or dialogue sounds less intelligible. In one embodiment, if the acoustic environment is live, directivity of at least one loudspeaker of the system is automatically adapted/adjusted to direct less acoustic energy towards the walls and the ceiling and to direct more acoustic energy towards the listener instead, thereby improving sound's intelligibility, stage image, and sense of immersion in the room.

As another example, if content type of audio to be reproduced by the loudspeakers is music, directivity of the loudspeakers are adapted/adjusted such that the loudspeakers are less directive. By comparison, if content type of the audio is speech instead, directivity of the loudspeakers is adapted/adjusted such that the loudspeakers are more directive.

In one embodiment, each loudspeaker of the system comprises an array of microphones ("microphone array") positioned on the loudspeaker (e.g., four capsules). For each loudspeaker of the system, a direction of the direct audio reproduced by the loudspeaker and first order reflections are estimated utilizing a microphone array of the loudspeaker, which in turn are used to estimate a distance and an orientation of the loudspeaker relative to a nearest boundary (e.g., wall, ceiling, floor) of the room.

In one embodiment, a microphone on a loudspeaker of the system may be used to determine the room acoustic parameters, such as RT and C.

FIG. 1 is an example computing architecture 100 for implementing automatic loudspeaker directivity adaptation, in one or more embodiments. The computing architecture 100 comprises an electronic device 110 including computing resources, such as one or more processor units 111 and one or more storage units 112. One or more applications 116 may execute/operate on the electronic device 110 utilizing the computing resources of the electronic device 110.

In one embodiment, the one or more applications 116 on the electronic device 110 include an automatic loudspeaker directivity adaptation system 120 that provides automatic loudspeaker directivity adaptation (without user interaction) for a multichannel audio loudspeaker system 140 integrated in or coupled to the electronic device 110. The loudspeaker system 140 comprises a plurality of loudspeakers 141 (FIG. 2) for audio reproduction. For example, in one embodiment, the loudspeakers 141 include at least one loudspeaker 141 designed for reproducing mid-frequency and high-frequency sounds and, optionally, at least one subwoofer designed for reproducing low-frequency sounds. The loudspeakers 141 are arranged in a room 300 (FIG. 2A) (or any other space) that includes a listening area. The listening area represents a spatial area within the room 300 where one or more listeners 301 (FIG. 5A) (i.e., users) will be positioned during the audio reproduction (via the loudspeaker system 140).

In one embodiment, at least one of the loudspeakers 141 comprises at least one driver (e.g., main woofer) 142 for emitting audio/sound. For example, in one embodiment, each loudspeaker 141 comprises at least two drivers 142.

In one embodiment, each loudspeaker 141 comprises at least one nearfield (NF) microphone ("mic") 143 positioned on or within proximity of the loudspeaker 141 (e.g., positioned within proximity of a driver 142 of the loudspeaker 141). For example, in one embodiment, each loudspeaker 141 comprises a microphone array comprising a plurality of microphones 143 (e.g., 4 capsules). As another example, in one embodiment, each loudspeaker 141 comprises only one microphone 143.

In one embodiment, the automatic loudspeaker directivity adaptation system 120 provides automatic loudspeaker directivity adaptation of the one or more loudspeakers 141. For example, in one embodiment, for at least one of the loudspeakers 141, the system 120 is configured to: (1) reproduce audio in the room 300 utilizing one loudspeaker 141 of the loudspeaker system 140 as a source of the audio, (2) measure RIRs from the loudspeaker 141 to one or more microphones 143 of one or more remaining loudspeakers 141 of the loudspeaker system 140, (3) determine one or more room acoustic parameters (i.e., reverberation time, clarity) of the room 300 based on the RIRs, (4) determine loudspeaker position information (i.e., orientation, distance/proximity to nearest boundary) of each loudspeaker 141 based on the RIRs, (5) determine recommended directivity of each loudspeaker 141 based on the one or more room acoustic parameters and loudspeaker position information of the loudspeaker 141, and (6) automatically adapt/adjust directivity of each loudspeaker 141 based in part on recommended directivity of the loudspeaker 141.

Examples of an electronic device 110 include, but are not limited to, a media system including an audio system, a media playback device including an audio playback device, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of Things (IoT) device, a cable box, a satellite receiver, etc.

In one embodiment, the electronic device 110 comprises one or more sensor units 114 integrated in or coupled to the electronic device 110, such as a camera, a microphone, a GPS, a motion sensor, etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user preferences, configure one or more parameters, provide user input, etc.

In one embodiment, the one or more applications on the electronic device 110 may further include one or more software mobile applications 116 loaded onto or downloaded to the electronic device 110, such as an audio streaming application, a video streaming application, etc. A software mobile application 116 on the electronic device 110 may exchange data with the automatic loudspeaker directivity adaptation system 120.

In one embodiment, the electronic device 110 comprises a communications unit 115 configured to exchange data with a remote computing environment, such as a remote computing environment 130 over a communications network/connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth®, high frequency systems (e.g., 900 MHZ, 2.4 GHZ, and 5.6 GHz communication systems), infrared, GSM, GSM plus EDGE, CDMA, quadband, and other cellular protocols, VOIP, TCP-IP, or any other suitable protocol.

In one embodiment, the remote computing environment 130 includes computing resources, such as one or more servers 131 and one or more storage units 132. One or more applications 133 that provide higher-level services may execute/operate on the remote computing environment 130 utilizing the computing resources of the remote computing environment 130.

In one embodiment, the remote computing environment 130 provides an online platform for hosting one or more online services (e.g., an audio streaming service, a video streaming service, etc.) and/or distributing one or more applications. For example, the automatic loudspeaker directivity adaptation system 120 may be loaded onto or downloaded to the electronic device 110 from the remote computing environment 130 that maintains and distributes updates for the system 120. As another example, a remote computing environment 130 may comprise a cloud computing environment providing shared pools of configurable computing system resources and higher-level services.

In one embodiment, the automatic loudspeaker directivity adaptation system 120 is integrated into, or implemented as part of, a loudspeaker control system or a loudspeaker management system.

One or more embodiments may be implemented in soundbars with satellite loudspeakers (surround loudspeakers) to provide automatic loudspeaker directivity adaptation. One or more embodiments may be implemented in TVs for use in combination with soundbars and surround loudspeakers.

One or more embodiments provide a standard stereo setup that increases immersion and spatial experience of a listener in the room 300.

Figure 2A:
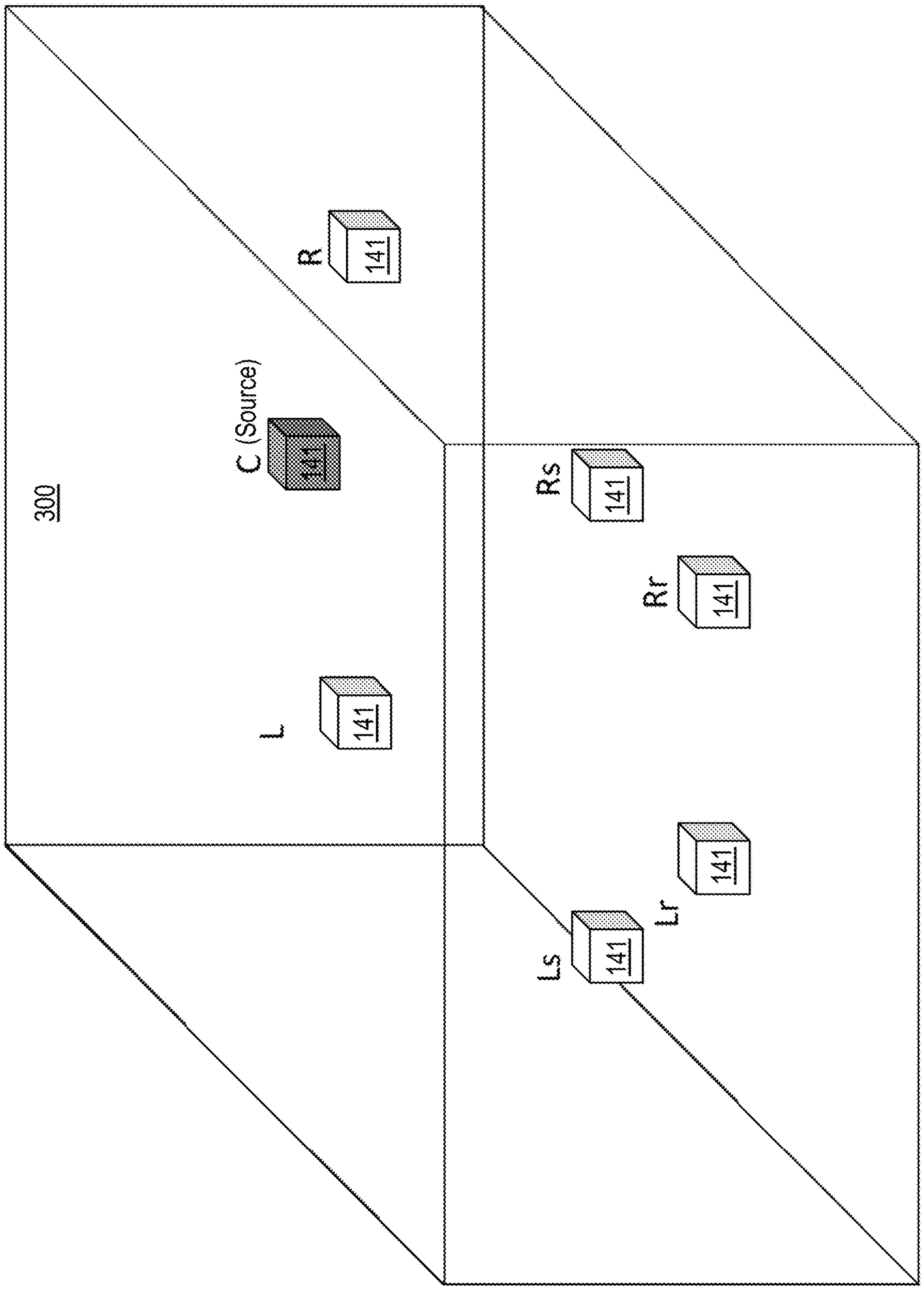
FIG. 2A illustrates a first example loudspeaker setup for a multichannel audio loudspeaker system in a room, in one or more embodiments.

FIG. 2A illustrates a first example loudspeaker setup for a multichannel audio loudspeaker system 140 in a room 300, in one or more embodiments. The loudspeaker system 140 comprises a plurality of loudspeakers 141 designed for reproducing mid-frequency and high-frequency sounds. In one embodiment, each loudspeaker 141 includes a main woofer/driver 142 (FIG. 1) for reproducing audio. In one embodiment, the plurality of loudspeakers 141 are designed for placement in accordance with the ITU standard, i.e., the ITU standard defines/recommends a loudspeaker placement for each loudspeaker 141. For example, in one embodiment, the plurality of loudspeakers 141 include a first loudspeaker 141 ("L loudspeaker") with a loudspeaker placement at a front left of the room 300, a second loudspeaker 141 ("C loudspeaker") with a loudspeaker placement at a front center of the room 300, a third loudspeaker 141 ("R loudspeaker") with a loudspeaker placement at a front right of the room 300, a fourth loudspeaker 141 ("Rs loudspeaker") with a loudspeaker placement at a side right of the room 300, a fifth loudspeaker 141 ("Rr loudspeaker") with a loudspeaker placement at a rear right of the room 300, a sixth loudspeaker 141 ("Lr loudspeaker") with a loudspeaker placement at a rear left of the room 300, and a seventh loudspeaker 141 ("Ls loudspeaker") with a loudspeaker placement at a side left of the room 300.

In one embodiment, the loudspeaker system 140 optionally includes one or more subwoofers designed for reproducing low-frequency sounds. For example, in one embodiment, the loudspeaker system 140 includes one subwoofer, as shown in FIGS. 5A-7B.

In one embodiment, the loudspeaker system 140 comprises a plurality of audio channels. Each audio channel provides, as output, audio reproduced by at least one loudspeaker 141 of the loudspeaker system 140. For example, in one embodiment, for the loudspeaker system 140 to provide 7.1 surround sound (i.e., 7.1 channel playback), the plurality of audio channels includes a left channel, a center channel, a right channel, a right back channel, a right surround channel, a left back channel, a left surround channel, and a subwoofer (alternatively, low-frequency) channel. As another example, in one embodiment, for the loudspeaker system 140 to provide 7.1.4 surround sound (i.e., 7.1 channel playback), the plurality of audio channels include a left channel, a center channel, a right channel, a right back channel, a right surround channel, a left back channel, a left surround channel, a left front up channel, a right front up channel, a left back up channel, a right back up channel, and a subwoofer (alternatively, low-frequency) channel. A listener perceives sound as coming from above via the left front up channel, the right front up channel, the left back up channel, and/or the right back up channel.

In one embodiment, each loudspeaker 141 includes one or more nearfield (NF) microphones 143 (e.g., positioned within proximity of a main woofer/driver 142 of the loudspeaker 141). For example, in one embodiment, each loudspeaker 141 comprises a microphone array (e.g., 4 capsules). As another example, in one embodiment, each loudspeaker 141 comprises only one microphone 143.

To determine one or more room acoustic parameters of the room 300, such as reverberation time and clarity, the automatic loudspeaker directivity adaptation system 120 is configured to: (1) reproduce audio in the room 300 utilizing one loudspeaker 141 of the loudspeaker system 140 as a source of the audio, (2) measure RIRs resulting from the audio utilizing one or more microphones 143 of one or more remaining loudspeakers 141 of the loudspeaker system 140, and (3) determine the one or more room acoustic parameters of the room 300 based on the RIRs. In one embodiment, the RIRs are measured using MLS signals, logarithmic sine sweeps, and/or other methods (e.g., the audio comprises MLS signals). Different loudspeaker setups for the loudspeaker system 140 may be implemented.

For example, with the first example loudspeaker setup shown in FIG. 2A, the automatic loudspeaker directivity adaptation system 120 utilizes the C loudspeaker the source, and utilizes microphones 143 on the L loudspeaker, the R loudspeaker, the Rs loudspeaker, the Rr loudspeaker, the Lr loudspeaker, and the Ls loudspeaker to measure the RIRs.

Figure 2B:
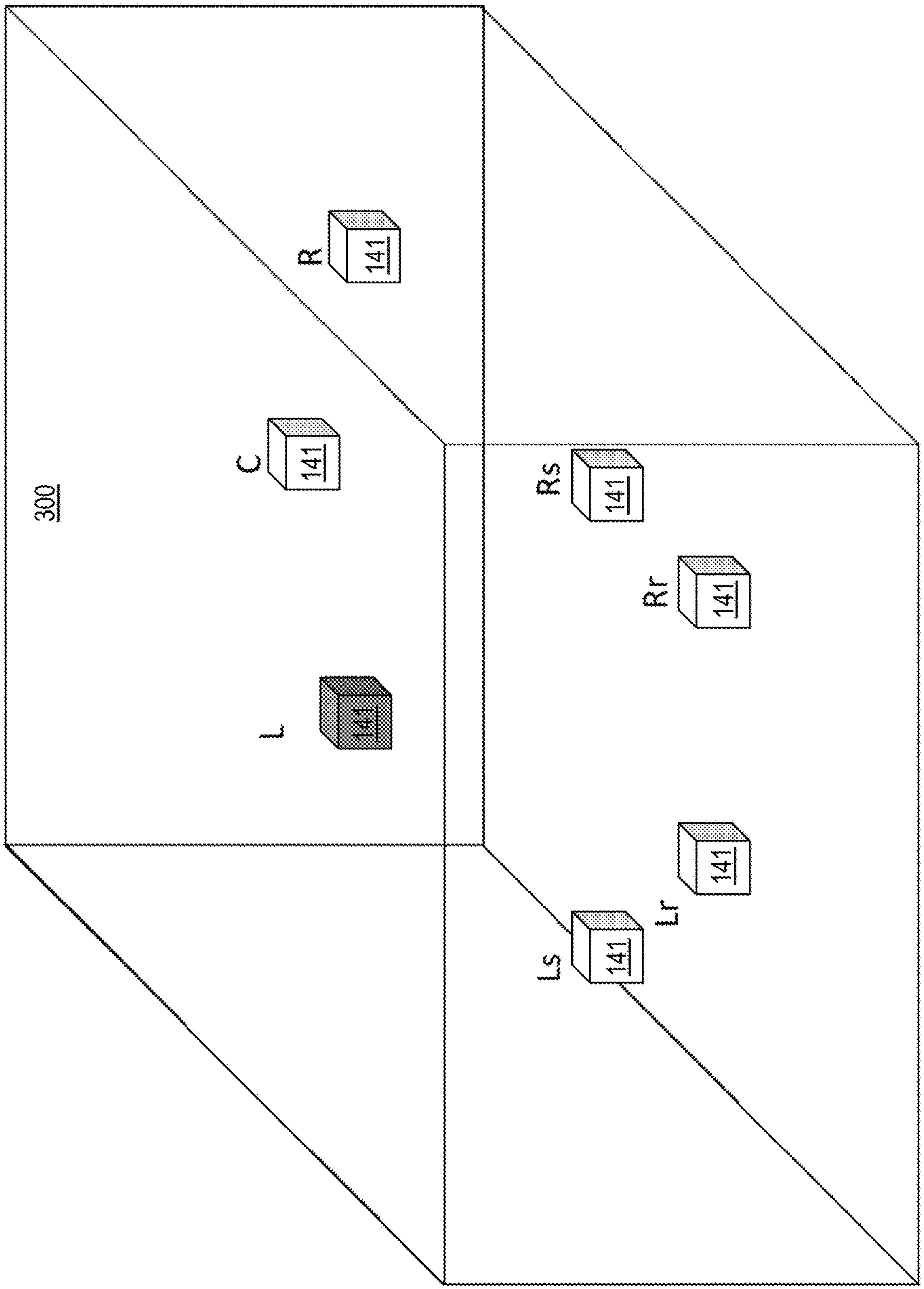
FIG. 2B illustrates a second example loudspeaker setup for a multichannel audio loudspeaker system in a room, in one or more embodiments.

FIG. 2B illustrates a second example loudspeaker setup for a multichannel audio loudspeaker system 140 in a room 300, in one or more embodiments. As another example, with the second example loudspeaker setup shown in FIG. 2B, the automatic loudspeaker directivity adaptation system 120 utilizes the L loudspeaker as the source instead, and utilizes microphones 143 on the C loudspeaker, the R loudspeaker, the Rs loudspeaker, the Rr loudspeaker, the Lr loudspeaker, and the Ls loudspeaker to measure the RIRs.

Figure 2C:
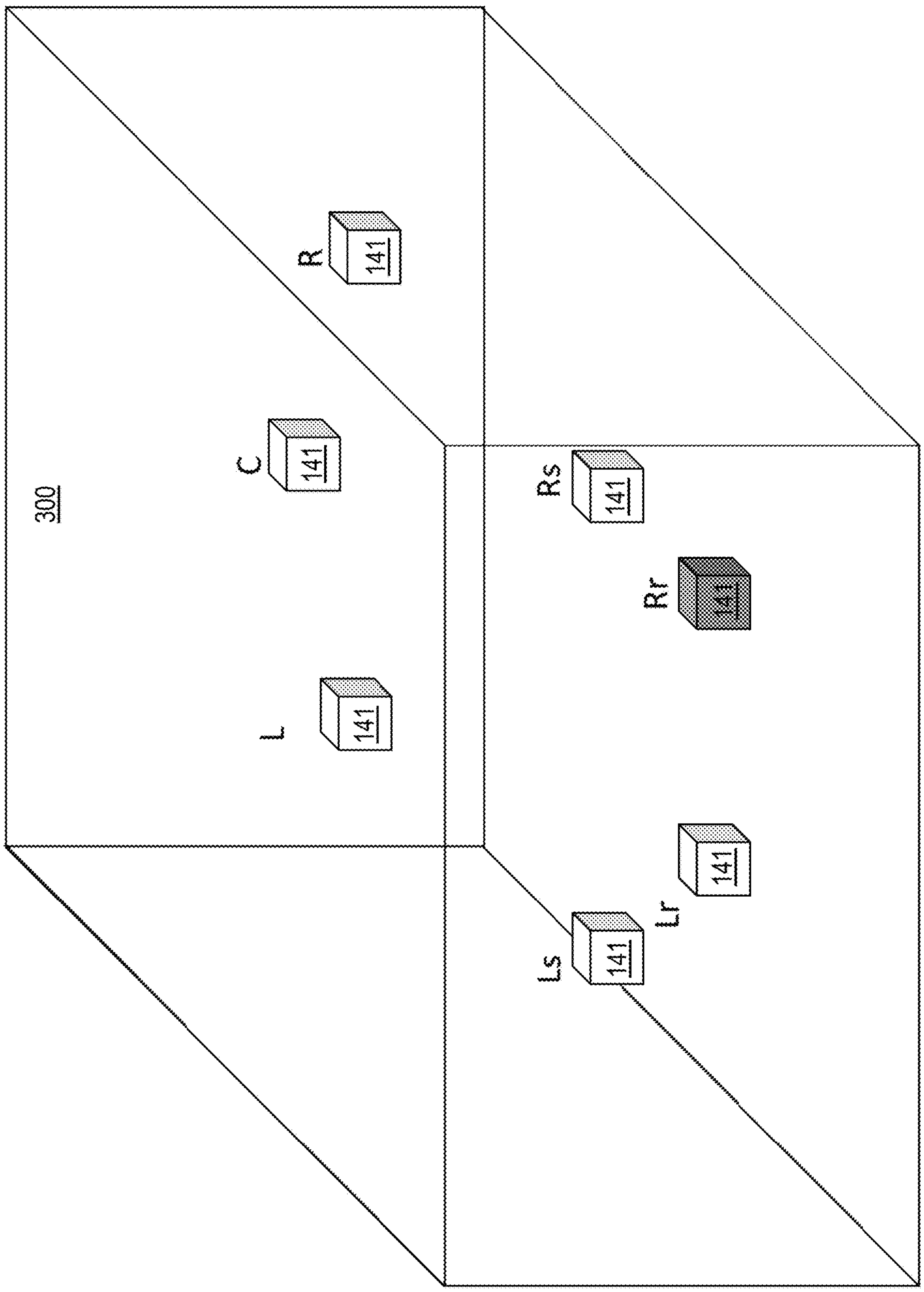
FIG. 2C illustrates a third example loudspeaker setup for a multichannel audio loudspeaker system in a room, in one or more embodiments.

FIG. 2C illustrates a third example loudspeaker setup for a multichannel audio loudspeaker system 140 in a room 300, in one or more embodiments. As another example, with the third example loudspeaker setup shown in FIG. 2C, the automatic loudspeaker directivity adaptation system 120 utilizes the Rr loudspeaker as the source instead, and utilizes microphones 143 on the L loudspeaker, the C loudspeaker, the R loudspeaker, the Rs loudspeaker, the Lr loudspeaker, and the Ls loudspeaker to measure the RIRs.

Figure 3A:
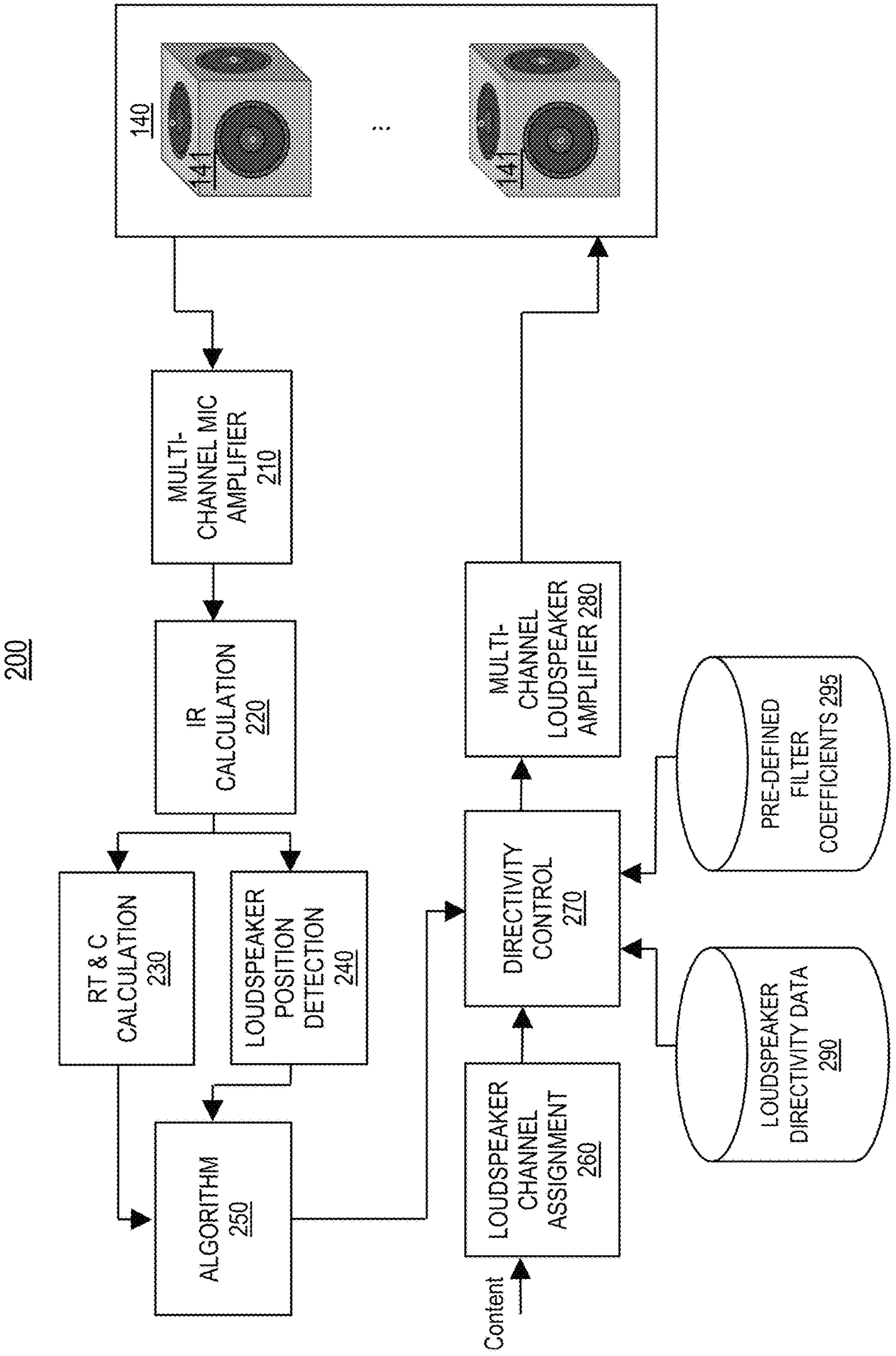
FIG. 3A illustrates an example automatic loudspeaker directivity adaptation system, in one or more embodiments.

FIG. 3A illustrates an example automatic loudspeaker directivity adaptation system 200, in one or more embodiments. In one embodiment, the automatic loudspeaker directivity adaptation system 120 in FIG. 1 is implemented as the automatic loudspeaker directivity adaptation system 200.

In one embodiment, the system 200 comprises an impulse response (IR) calculation unit 220 for measuring RIRs. As part of measuring RIRs, the IR calculation unit 220 is configured to: (1) reproduce audio in the room 300 utilizing one loudspeaker 141 of the loudspeaker system 140 as a source of the audio (e.g., C loudspeaker as shown in FIG. 2A), and (2) measure RIRs resulting from the audio utilizing one or more microphones 143 of one or more remaining loudspeakers 141 of the loudspeaker system 140.

In one embodiment, the system 200 comprises a multichannel mic amplifier 210. For each microphone 143 of the loudspeaker system 140 that the system 200 utilizes to measure RIRs, the mic amplifier 210 is configured to: (1) receive one or more signals captured by the microphone 143, wherein the one or more signals result from reproduction of audio in the room 300 as part of measuring RIRs, and (2) amplify the one or more signals.

For at least one loudspeaker 141 of the loudspeaker system 140, the IR calculation unit 210 is further configured to: (1) receive (e.g., from the mic amplifier 210) one or more amplified signals captured by one or more microphones 143 of the loudspeaker 141, and (2) measure, based on the one or more amplified signals, one or more RIRs (or an IR/transfer function) corresponding to the loudspeaker 141. The IR calculation unit 210 determines a direction of a direct sound and a first order reflection utilizing a microphone array of the loudspeaker 141 and an intensity vector calculation.

In one embodiment, the system 200 comprises a reverberation time and clarity (RT & C) calculation unit 230. For at least one loudspeaker 141 of the loudspeaker system 140, the RT & C calculation unit 210 is configured to: (1) receive (e.g., from the IR calculation unit 210) one or more RIRs (or an IR/transfer function) corresponding to the loudspeaker 141, and (2) determine, based on the one or more RIRs, reverberation time (e.g., $RT_{60}$) and clarity (e.g., $C_{80}$) in the room 300 relative to the loudspeaker 141.

In one embodiment, the system 200 comprises a loudspeaker position detection unit 240. For at least one loudspeaker 141 of the loudspeaker system 140, the loudspeaker position detection unit 240 is configured to: (1) receive (e.g., from the IR calculation unit 210) one or more RIRs (or an IR/transfer function) corresponding to the loudspeaker 141, and (2) determine, based on the one or more RIRs, loudspeaker position information (i.e., orientation, distance/proximity to nearest boundary) corresponding to the loudspeaker 141. In one embodiment, the loudspeaker position information corresponding to the loudspeaker 141 comprises: (1) a distance from the loudspeaker 141 to a nearest boundary (e.g., wall, ceiling, floor) of the room 300, and (2) an orientation of the loudspeaker 141 relative to the nearest boundary of the room 300.

In one embodiment, the system 200 comprises an algorithm unit 250. For at least one loudspeaker 141 of the loudspeaker system 140, the algorithm unit 250 is configured to: (1) receive (e.g., from the RT & C calculation unit 210) reverberation time and clarity in the room 300 relative to the loudspeaker 141, (2) receive (e.g., from the loudspeaker position detection unit 240) loudspeaker position information corresponding to the loudspeaker 141, and (3) determine, based on the reverberation time, the clarity, and the loudspeaker position information, a recommended directivity of the loudspeaker 141.

In one embodiment, the system 200 comprises a loudspeaker channel assignment unit 260. The loudspeaker channel assignment unit 260 is configured to receive content (e.g., a media program) from an input source (e.g., an audio streaming application/service) for audio reproduction, wherein the content comprises at least one input audio corresponding to at least one audio channel of the loudspeaker system 140. For example, in one embodiment, the loudspeaker channel assignment unit 260 is configured to receive at least one of input audio $I_L$, input audio $I_C$, input audio $I_R$, . . . , and input audio $I_{LS}$ corresponding to the left channel, the center channel, the right channel, . . . , and the left surround channel, respectively.

The loudspeaker channel assignment unit 260 is further configured to assign at least one audio channel of the loudspeaker system 140 to at least one loudspeaker 141 of the loudspeaker system 140, such that at least one input audio corresponding to the at least one audio channel is reproduced via the at least one loudspeaker 141 assigned. For example, in one embodiment, the left channel, the center channel, the right channel, . . . , and the left surround channel are assigned to the L loudspeaker, the C loudspeaker, the R loudspeaker, . . . , and the Ls loudspeaker, respectively. In one embodiment, the loudspeaker channel assignment unit 260 is configured to provide loudspeaker channel assignment data indicative of one or more assignments of one or more audio channels of the loudspeaker system 140 to one or more loudspeakers 141 of the loudspeaker system 140.

In one embodiment, the system 200 comprises a directivity control unit 270. For at least one loudspeaker 141 of the loudspeaker system 140, the directivity control unit 270 is configured to: (1) receive (e.g., from the algorithm unit 250) a recommended directivity of the loudspeaker 141, (2) receive (e.g., from the loudspeaker channel assignment unit 260) loudspeaker channel assignment data and/or input audio corresponding to an audio channel the loudspeaker 141 is assigned to, and (3) automatically adapt/adjust directivity of the loudspeaker 141 based in part on the recommended directivity. In one embodiment, the directivity of the loudspeaker 141 is adapted/adjusted to one of a plurality of directivity patterns. The plurality of directivity patterns include, but are not limited to, omnidirectional, subcardioid, cardioid, supercardioid, hypercardioid, etc.

In one embodiment, the directivity control unit 270 automatically adapts/adjusts a directivity of a loudspeaker 141 by applying digital signal processing (DSP) to input audio corresponding to an audio channel the loudspeaker 141 is assigned to, resulting in one or more processed signals for reproduction via the loudspeaker 141. In one embodiment, the directivity control unit 270 applies the DSP using, but not limited to, at least one of the following: applying a delay to the audio channel the loudspeaker 141 is assigned to, applying a gain to the audio channel the loudspeaker 141 is assigned to, applying a shading filter to the audio channel the loudspeaker 141 is assigned to, applying an all pass filter to the audio channel the loudspeaker 141 is assigned to, or applying a finite impulse response (FIR) filter to the audio channel the loudspeaker 141 is assigned to.

In one embodiment, each delay, gain, or filter applied as part of the DSP is pre-optimized for the adapted/adjusted directivity. For example, in one embodiment, the system 200 maintains a database 295 comprising pre-defined filter coefficients specifying pre-optimized delays, gains, and filters for different directivity patterns the loudspeakers 141 may be adapted/adjusted to.

Let Q(f) generally denote a directivity factor, and let DI(f) generally denote a directivity index. A directivity factor Q(f) is a ratio of intensity on a designated axis of an audio/sound radiator at a stated distance r to the intensity that would be produced at the same position by a point source if it were radiating the same total acoustic power as the radiator, assuming free space. A directivity index DI(f) is ten (10) times the logarithm to base 10 of a directivity factor Q(f), expressed in accordance with equation (3) provided below:

$$DI(f) = 10\log_{10}Q(f). \qquad (3)$$

Each directivity pattern has a corresponding directivity index DI(f).

Table 1 below provides examples of different directivity patterns a directivity of a loudspeaker 141 may be automatically adapted/adjusted to for different values of reverberation times $RT_{60}$.

TABLE 1

| | DI(f) | | | |
|---|---|---|---|---|
| $RT_{60}$ | 0.0 | 3.0 | 4.8 | 5.7 |
| 0.2 | Omnidirectional | | | |
| 0.4 | | Subcardioid | | |
| 0.6 | | | Cardioid | |
| 0.8 | | | | Supercardioid |

In one embodiment, the mapping of the different values of reverberation times $RT_{60}$ to the different directivity patterns as shown in Table 1 may change based on user configuration/listener preferences.

Table 2 below provides examples of different directivity patterns a directivity of a loudspeaker 141 may be automatically adapted/adjusted to for different values of clarity $C_{80}$.

TABLE 2

| | DI(f) | | | |
|---|---|---|---|---|
| $C_{80}$ | 0.0 | 3.0 | 4.8 | 5.7 |
| 20.0 | Omnidirectional | | | |
| 17.5 | | Subcardioid | | |
| 15.0 | | | Cardioid | |
| 12.5 | | | | Supercardioid |

In one embodiment, the mapping of the different values of clarity $C_{80}$ to the different directivity patterns as shown in Table 2 may change based on user configuration/listener preferences.

In one embodiment, the directivity control unit 270 automatically adapts/adjusts a directivity of a loudspeaker 141 further based on content type of input audio corresponding to an audio channel the loudspeaker 141 is assigned to. For example, in one embodiment, the system 200 maintains a database 290 comprising recommended directivity patterns for different content types.

Table 3 below provides examples of different directivity patterns a directivity of a loudspeaker 141 may be automatically adapted/adjusted to for different content types.

TABLE 3

| | DI(f) | |
|---|---|---|
| Content | 3.0 | 4.8 |
| Speech/Dialogue | Subcardioid | |
| Music | | Cardioid |

As shown in Table 3, if content type of input audio corresponding to an audio channel a loudspeaker 141 is assigned to is music, directivity of the loudspeaker 141 is automatically adapted/adjusted such that the loudspeaker 141 is less directive (e.g., cardioid directivity pattern). By comparison, if the content type is speech instead, directivity of the loudspeaker 141 is automatically adapted/adjusted such that the loudspeaker 141 is more directive (e.g., subcardioid directivity pattern).

In one embodiment, the mapping of the different content types to the different directivity patterns as shown in Table 3 may change based on user configuration/listener preferences.

The directivity of the loudspeaker 141 may be adapted/adjusted such that acoustic energy reproduced by the loudspeaker 141 is directed towards a ceiling of a room 300, a floor of the room, one or more walls of the room 300, and/or a listener 301 in the room 300. The system 200 automatically optimizes the sound field produced by the loudspeaker system 140 (e.g., standard stereo setup) without user interaction. For example, if the reverberation time RT in the room is short (i.e., an acoustic environment of the room is dry), directivity of the loudspeaker 141 is adapted/adjusted to direct more acoustic energy towards the walls and the ceiling, thereby improving sound's sense of immersion and perceived envelopment in the room. As another example, if the reverberation time RT in the room is long (i.e., the acoustic environment of the room live), directivity of the loudspeaker 141 is adapted/adjusted to direct less acoustic energy towards the walls and the ceiling and to direct more acoustic energy towards the listener instead, thereby improving sound's intelligibility, stage image, and sense of immersion in the room. The system 200 adapts/adjusts a spatial experience of the listener in the room during audio reproduction of the content (via the loudspeaker system 140).

In one embodiment, the system 200 comprises a multichannel audio loudspeaker amplifier unit 280. For at least one loudspeaker 141 of the loudspeaker system 140, the loudspeaker amplifier unit 280 is configured to: (1) receive (e.g., from the directivity control unit 270) one or more processed signals for reproduction via the loudspeaker 141, (2) amplify the one or more processed signals, and (3) provide the one or more resulting amplified signals to the loudspeaker 141 for reproduction.

Figure 3B:
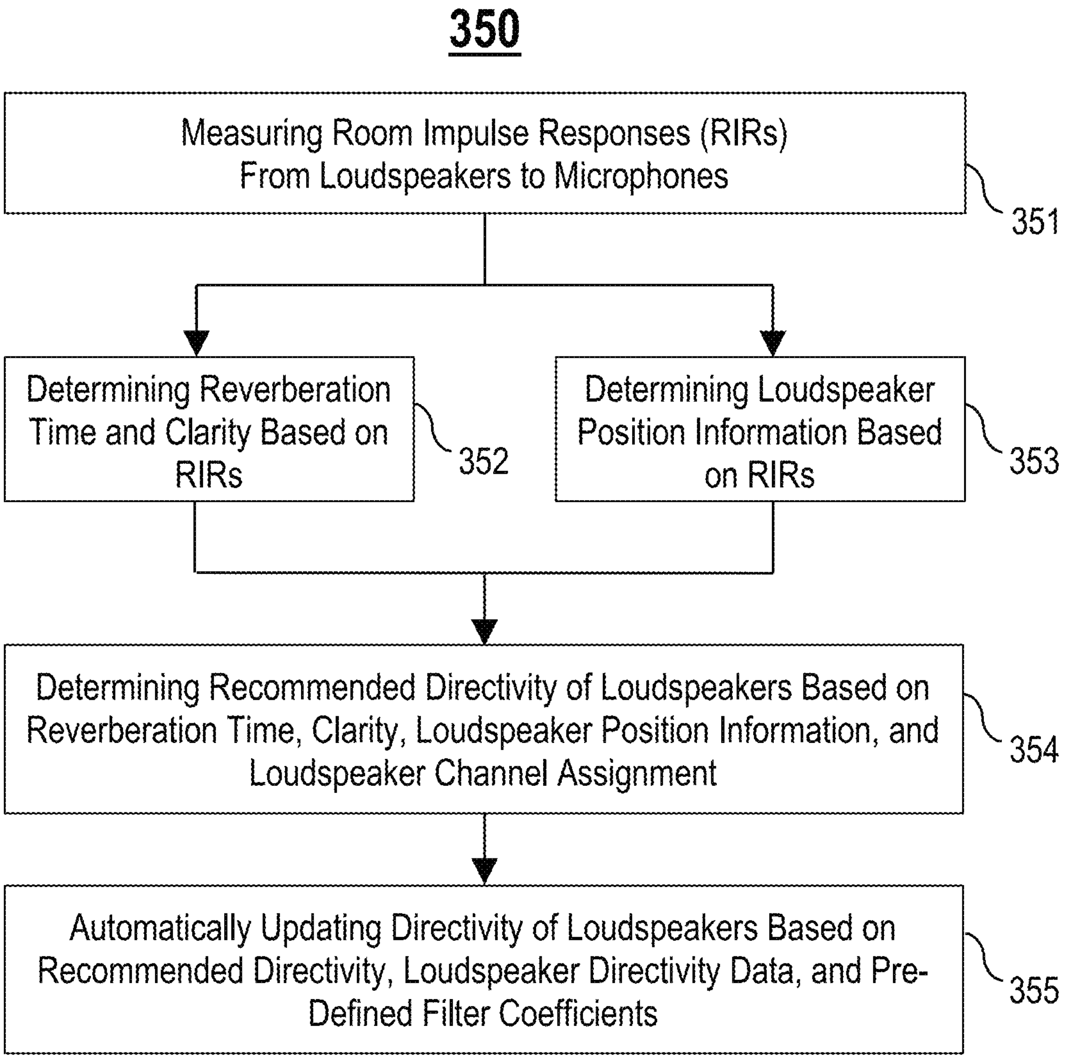
FIG. 3B is a flowchart of an example process for automatic loudspeaker directivity adaptation, in one or more embodiments.

FIG. 3B is a flowchart of an example process 350 for automatic loudspeaker directivity adaptation, in one or more embodiments. Process block 351 includes measuring (e.g., via the IR calculation unit 220) RIRs from loudspeakers (e.g., loudspeakers 141) to microphones (e.g., microphones 143), and proceeding to process blocks 352 and 353. Process block 352 includes determining (e.g., via the RT & C calculation unit 230) reverberation time (e.g., $RT_{60}$) and clarity (e.g., $C_{80}$) based on RIRs, and proceeding to process block 354. Process block 353 includes determining (e.g., via the loudspeaker position detection unit 240) loudspeaker position information (i.e., orientation, distance/proximity to nearest boundary) based on RIRs, and proceeding to process block 354. Process block 354 includes determining (e.g., via the algorithm unit 250) recommended directivity of loudspeakers based on reverberation time, clarity, loudspeaker position information, and loudspeaker channel assignment (e.g., loudspeaker channel assignment data from the loudspeaker channel assignment unit 260), and proceeding to process block 355. Process block 355 includes automatically updating (e.g., via the directivity control unit 270) directivity of loudspeakers based on recommend directivity, loudspeaker directivity data (e.g., from the database 290 (FIG. 3A)), and pre-defined filter coefficients (e.g., from the database 295).

In one embodiment, process blocks 351-355 may be performed by one or more components of the automatic loudspeaker directivity adaptation system 200.

Figure 4:
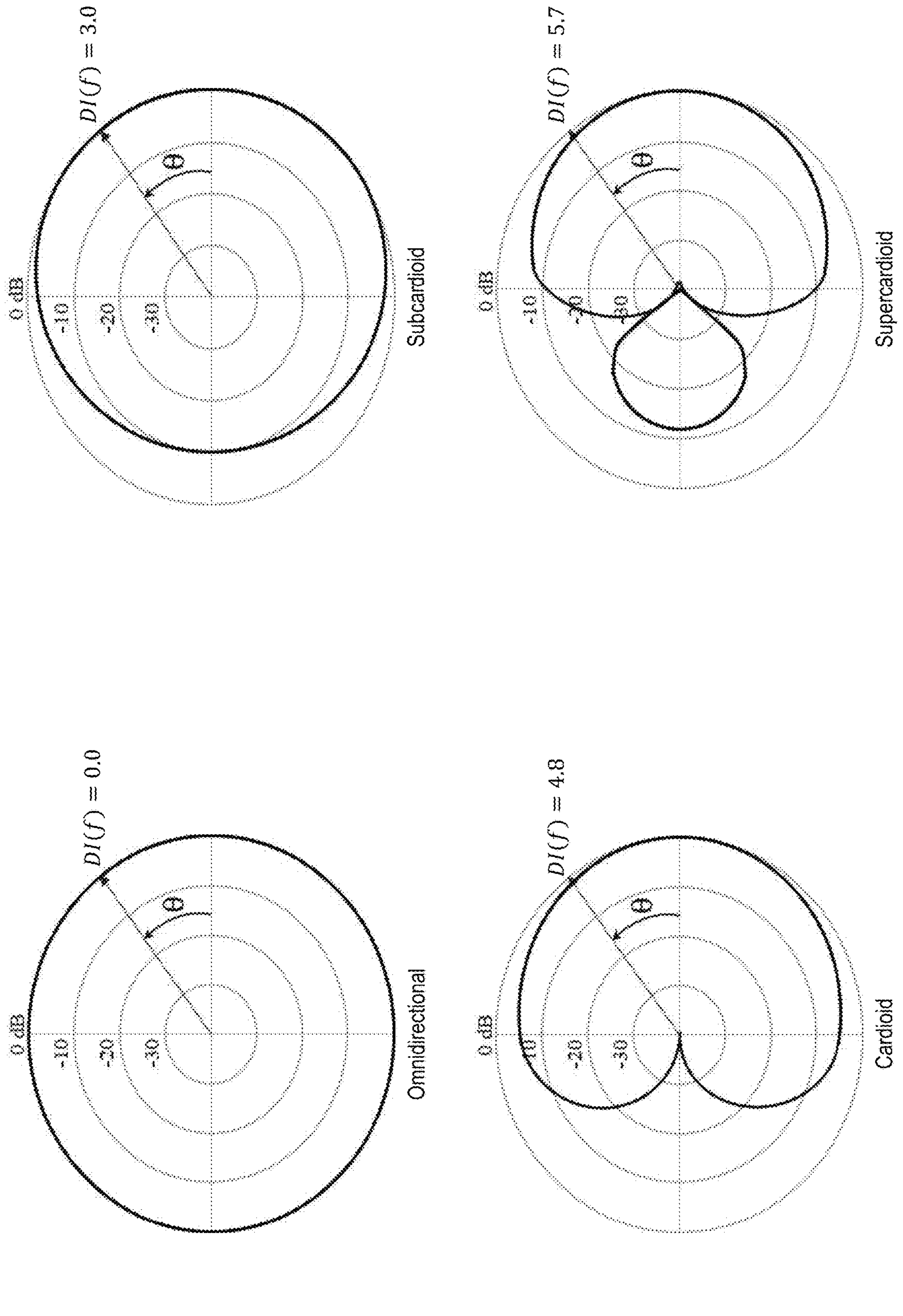
FIG. 4 illustrates different directivity patterns that the automatic loudspeaker directivity adaptation system may adapt/adjust a directivity of a loudspeaker to, in one or more embodiments.

FIG. 4 illustrates different directivity patterns that the automatic loudspeaker directivity adaptation system 200 may adapt/adjust a directivity of a loudspeaker 141 to, in one or more embodiments. In one embodiment, the different directivity patterns include, but are not limited to, omnidirectional, subcardioid, cardioid, supercardioid, hypercardioid, etc. In one embodiment, the directivity of the loudspeakers 141 is adapted/adjusted to one or the different directivity patterns in accordance with Tables 1, 2, and/or 3 provided above.

As shown in FIG. 4, omnidirectional directivity pattern has a corresponding directivity index DI(f) of 0.0 (i.e., same amount of acoustic energy directed in all directions), subcardioid directivity pattern has a corresponding directivity index DI(f) of 3.0, cardioid directivity pattern has a corresponding directivity index DI(f) of 4.8, and supercardioid directivity pattern has a corresponding directivity index DI(f) of 5.7.

Figure 5A:
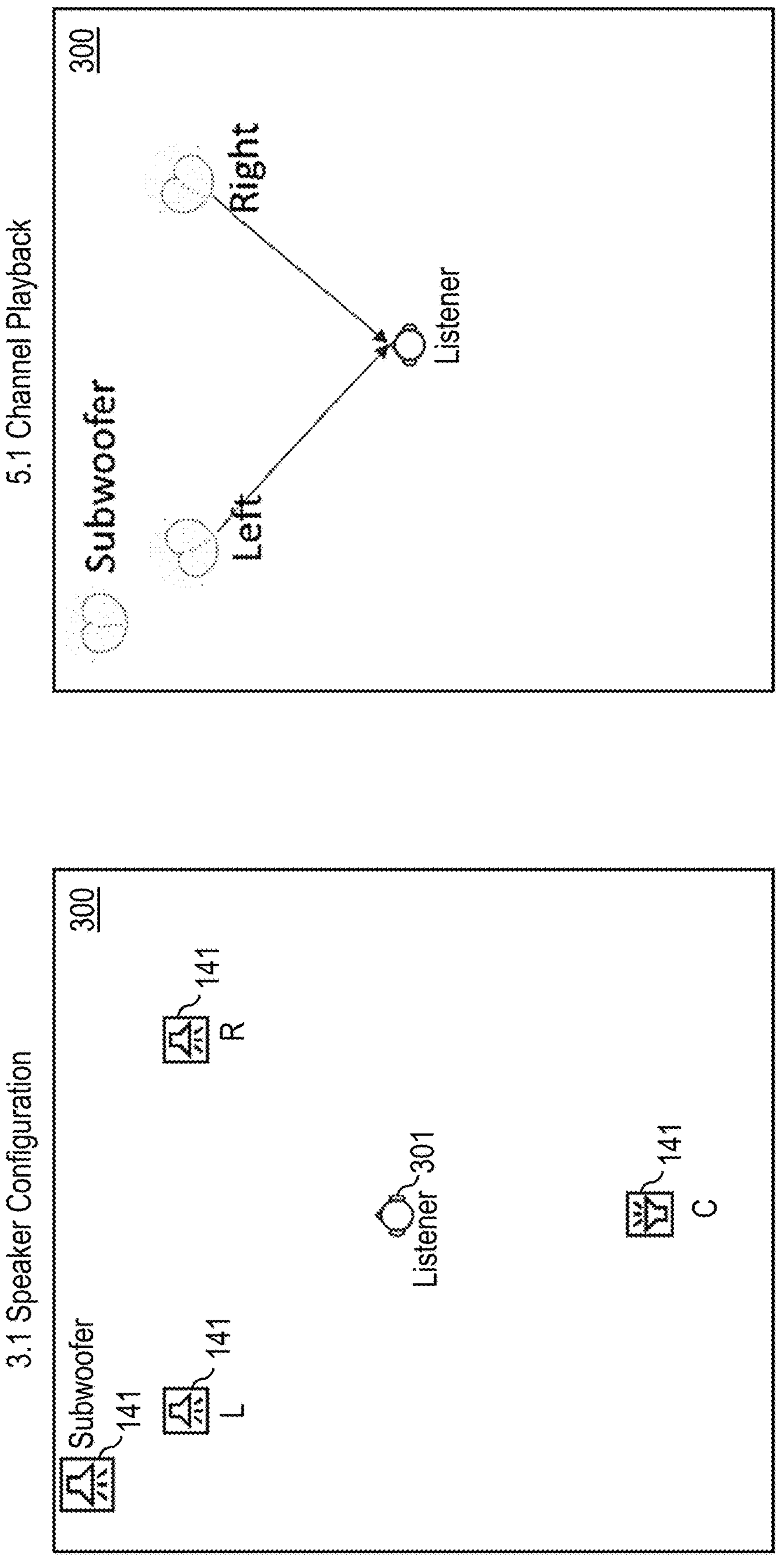
FIG. 5A illustrates an example 3.1 loudspeaker setup for a multichannel audio loudspeaker system in a room, in one or more embodiments.

FIG. 5A illustrates an example 3.1 loudspeaker setup (i.e., speaker configuration) for a multichannel audio loudspeaker system 140 in a room 300, in one or more embodiments. In one embodiment, the loudspeaker system 140 comprises a plurality of loudspeakers 141 arranged around a listener 301 in the room 300. Specifically, the loudspeakers 141 include a L loudspeaker arranged at a front left of the room 300, a R loudspeaker arranged at a front right of the room 300, a C loudspeaker arranged at a rear center of the room 300, and a subwoofer. Initially, the loudspeaker system 140 comprises a left channel, a right channel, and a subwoofer channel providing audio reproduced by the L loudspeaker, the R loudspeaker, and the subwoofer, respectively. Directivity of the L loudspeaker, the R loudspeaker, and the subwoofer are initially set to cardioid directivity pattern, as shown in FIG. 5A. Assume the loudspeaker system 140 is capable of providing 5.1 surround sound (i.e., 5.1 channel playback).

Figure 5B:
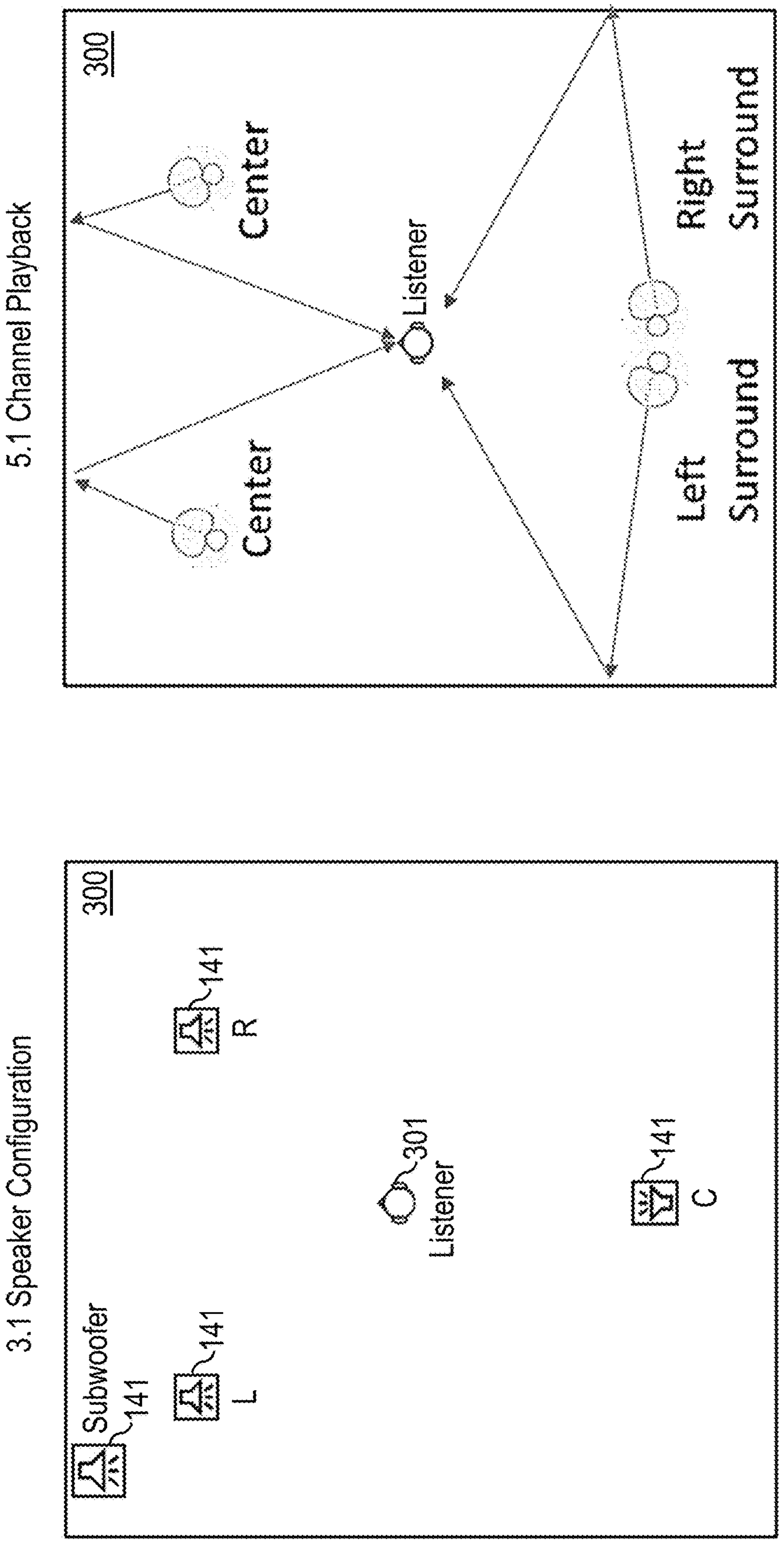
FIG. 5B illustrates an example set of adjustments to loudspeaker directivity of the loudspeaker system in FIG. 5A to improve 5.1 surround sound, in one or more embodiments.

FIG. 5B illustrates an example set of adjustments to loudspeaker directivity of the loudspeaker system 140 in FIG. 5A to improve 5.1 surround sound (i.e., 5.1 channel playback), in one or more embodiments. In one embodiment, as shown in FIG. 5B, the automatic loudspeaker directivity adaptation system 200 improves 5.1 surround sound (i.e., improves sound's sense of immersion and perceived envelopment in the room 300) by: (1) assigning a center channel of the loudspeaker system 140 to the L loudspeaker and the R loudspeaker, (2) assigning a left surround channel of the loudspeaker system 140 to the C loudspeaker, (3) assigning a right surround channel of the loudspeaker system 140 to the C loudspeaker, and (4) adapting/adjusting directivity of the L loudspeaker, the R loudspeaker, and the C loudspeaker to supercardioid directivity pattern, such that acoustic energy reproduced by the L loudspeaker, the R loudspeaker, and the C loudspeaker are directed towards walls of the room 300 which in turn reflects the acoustic energy to the listener 301.

Figure 6A:
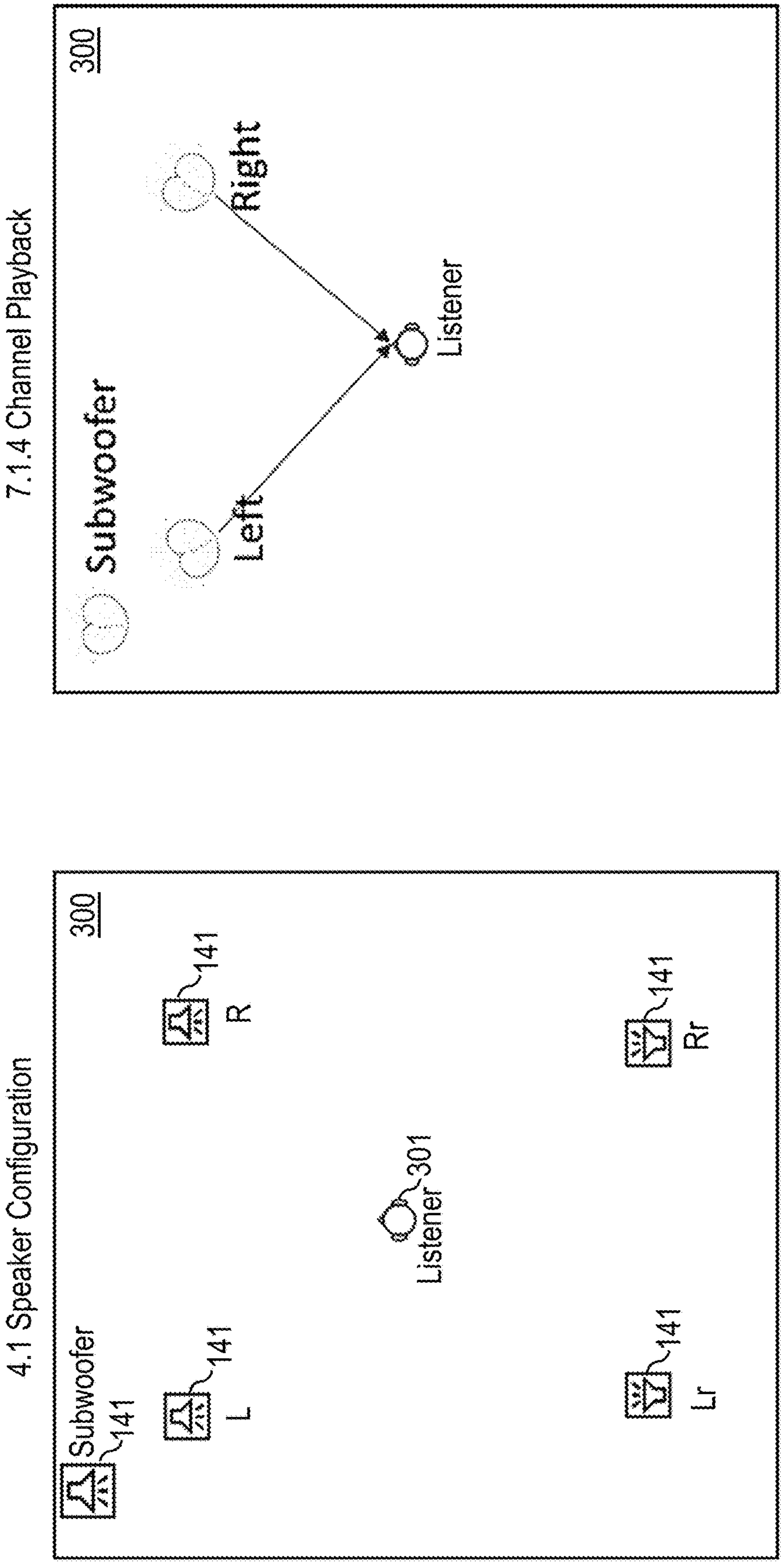
FIG. 6A illustrates an example 4.1 loudspeaker setup for a multichannel audio loudspeaker system in a room, in one or more embodiments.

FIG. 6A illustrates an example 4.1 loudspeaker setup (i.e., speaker configuration) for a multichannel audio loudspeaker system 140 in a room 300, in one or more embodiments. In one embodiment, the loudspeaker system 140 comprises a plurality of loudspeakers 141 arranged around a listener 301 in the room 300. Specifically, the loudspeakers 141 include a L loudspeaker arranged at a front left of the room 300, a R loudspeaker arranged at a front right of the room 300, a Lr loudspeaker arranged at a rear left of the room 300, a Rr loudspeaker arranged at a rear right of the room 300, and a subwoofer. Initially, the loudspeaker system 140 comprises a left channel, a right channel, and a subwoofer channel providing audio reproduced by the L loudspeaker, the R loudspeaker, and the subwoofer, respectively. Directivity of the L loudspeaker, the R loudspeaker, and the subwoofer are initially set to cardioid directivity pattern, as shown in FIG. 6A. Assume the loudspeaker system 140 is capable of providing 7.1.4 surround sound (i.e., 7.1.4 channel playback).

Figure 6B:
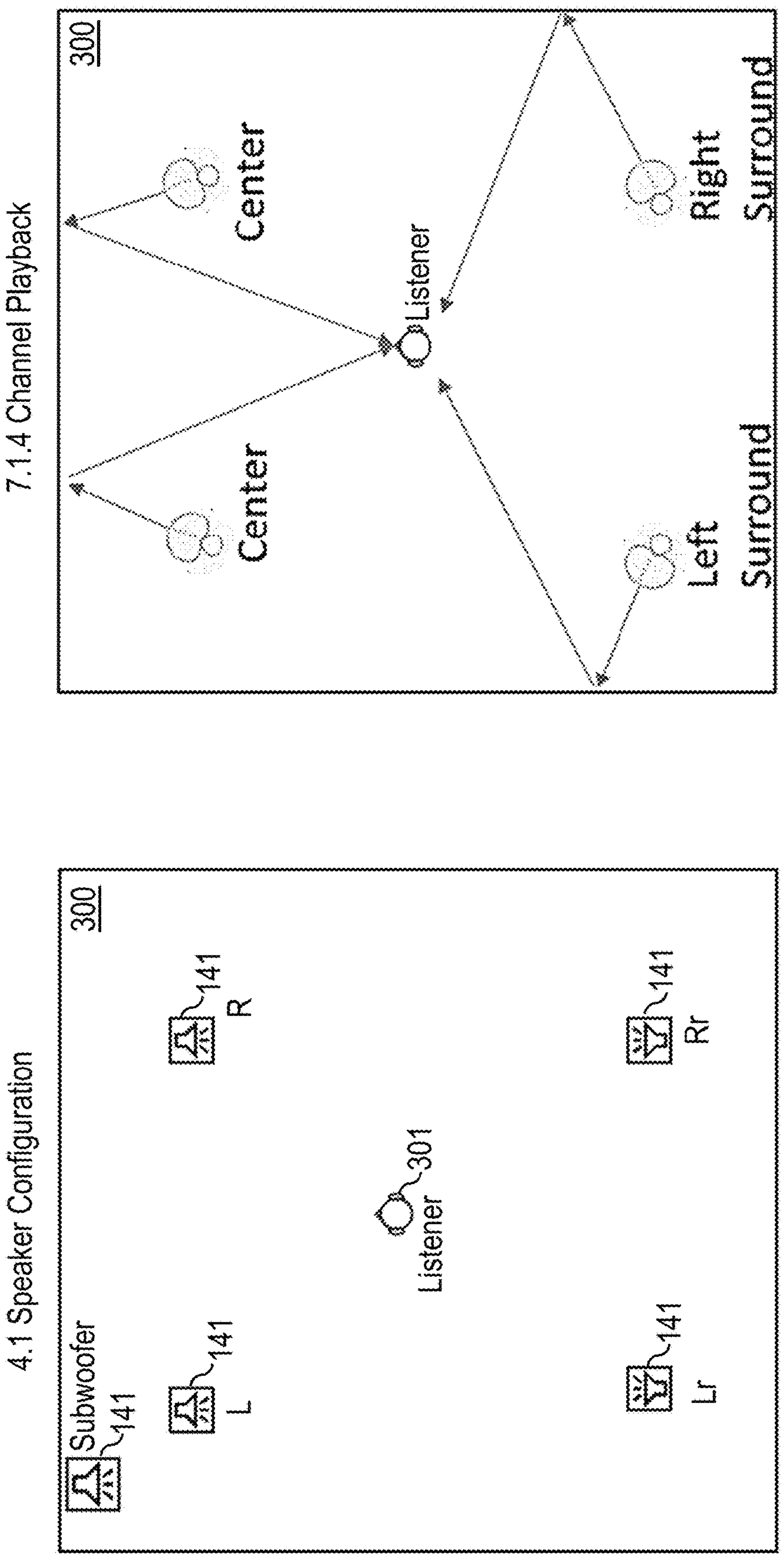
FIG. 6B illustrates a first example set of adjustments to loudspeaker directivity of the loudspeaker system in FIG. 6A to improve 7.1.4 surround sound, in one or more embodiments.

FIG. 6B illustrates a first example set of adjustments to loudspeaker directivity of the loudspeaker system 140 in FIG. 6A to improve 7.1.4 surround sound (i.e., 7.1.4 channel playback), in one or more embodiments. In one embodiment, as shown in FIG. 6B, the automatic loudspeaker directivity adaptation system 200 improves 7.1.4 surround sound (i.e., improves sound's sense of immersion and perceived envelopment in the room 300) by: (1) assigning a center channel of the loudspeaker system 140 to the L loudspeaker and the R loudspeaker, (2) assigning a left surround channel of the loudspeaker system 140 to the Lr loudspeaker, (3) assigning a right surround channel of the loudspeaker system 140 to the Rr loudspeaker, and (4) adapting/adjusting directivity of the L loudspeaker, the R loudspeaker, the Lr loudspeaker, and the Rr loudspeaker to supercardioid directivity pattern, such that acoustic energy reproduced by the L loudspeaker, the R loudspeaker, the Lr loudspeaker, and the Rr loudspeaker are directed towards walls of the room 300 which in turn reflects the acoustic energy to the listener 301.

Figure 6C:
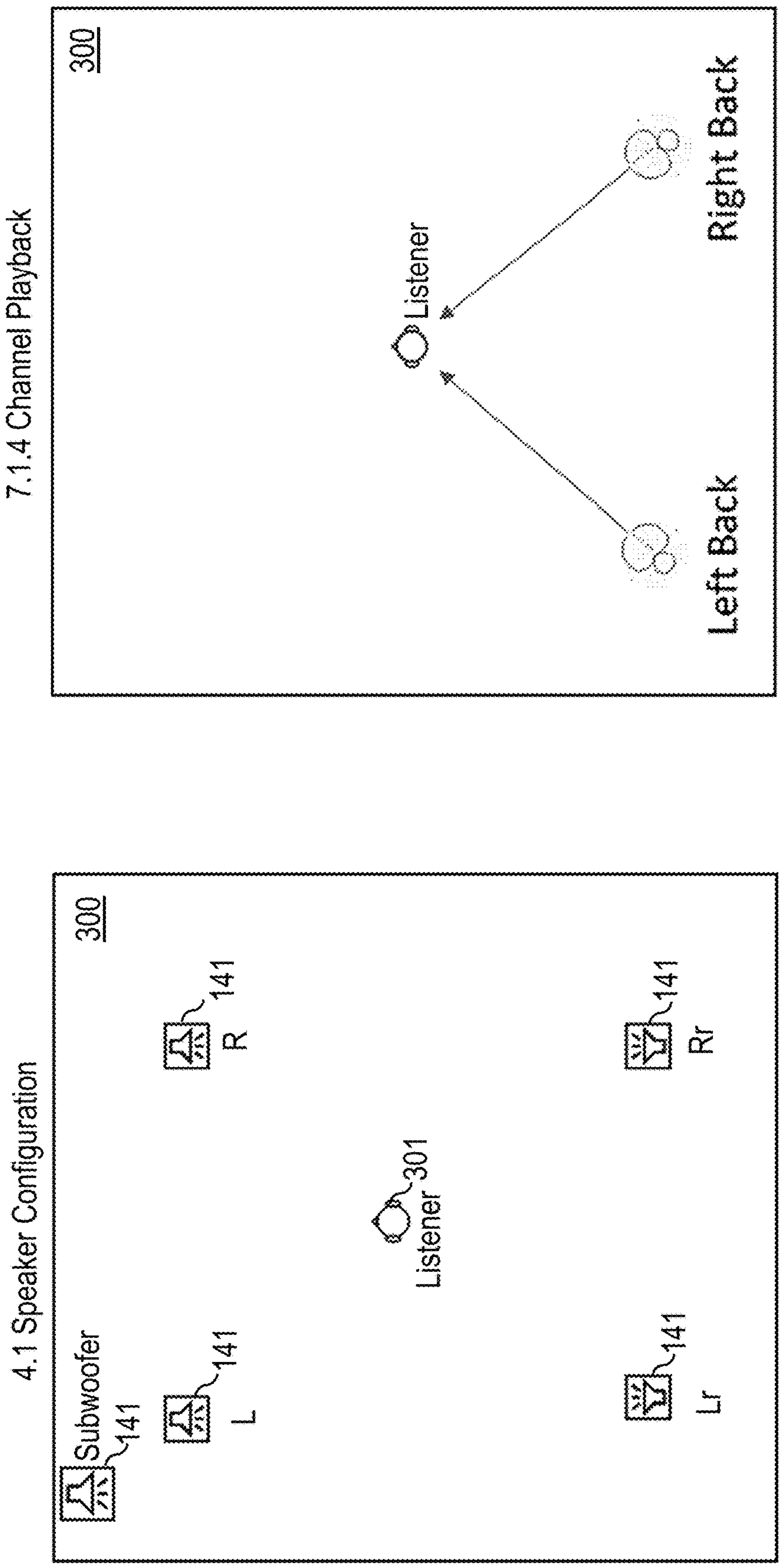
FIG. 6C illustrates a second example set of adjustments to loudspeaker directivity of the loudspeaker system in FIG. 6A to improve 7.1.4 surround sound, in one or more embodiments.

FIG. 6C illustrates a second example set of adjustments to loudspeaker directivity of the loudspeaker system 140 in FIG. 6A to improve 7.1.4 surround sound (i.e., 7.1.4 channel playback), in one or more embodiments. In one embodiment, as shown in FIG. 6C, the automatic loudspeaker directivity adaptation system 200 improves 7.1.4 surround sound (i.e., improves sound's sense of immersion and perceived envelopment in the room 300) by: (1) assigning a left back channel of the loudspeaker system 140 to the Lr loudspeaker, (2) assigning a right back channel of the loudspeaker system 140 to the Rr loudspeaker, and (3) adapting/adjusting directivity of the Lr loudspeaker and the Rr loudspeaker to supercardioid directivity pattern, such that acoustic energy reproduced by the Lr loudspeaker and the Rr loudspeaker are directed towards the listener 301.

Figure 6D:
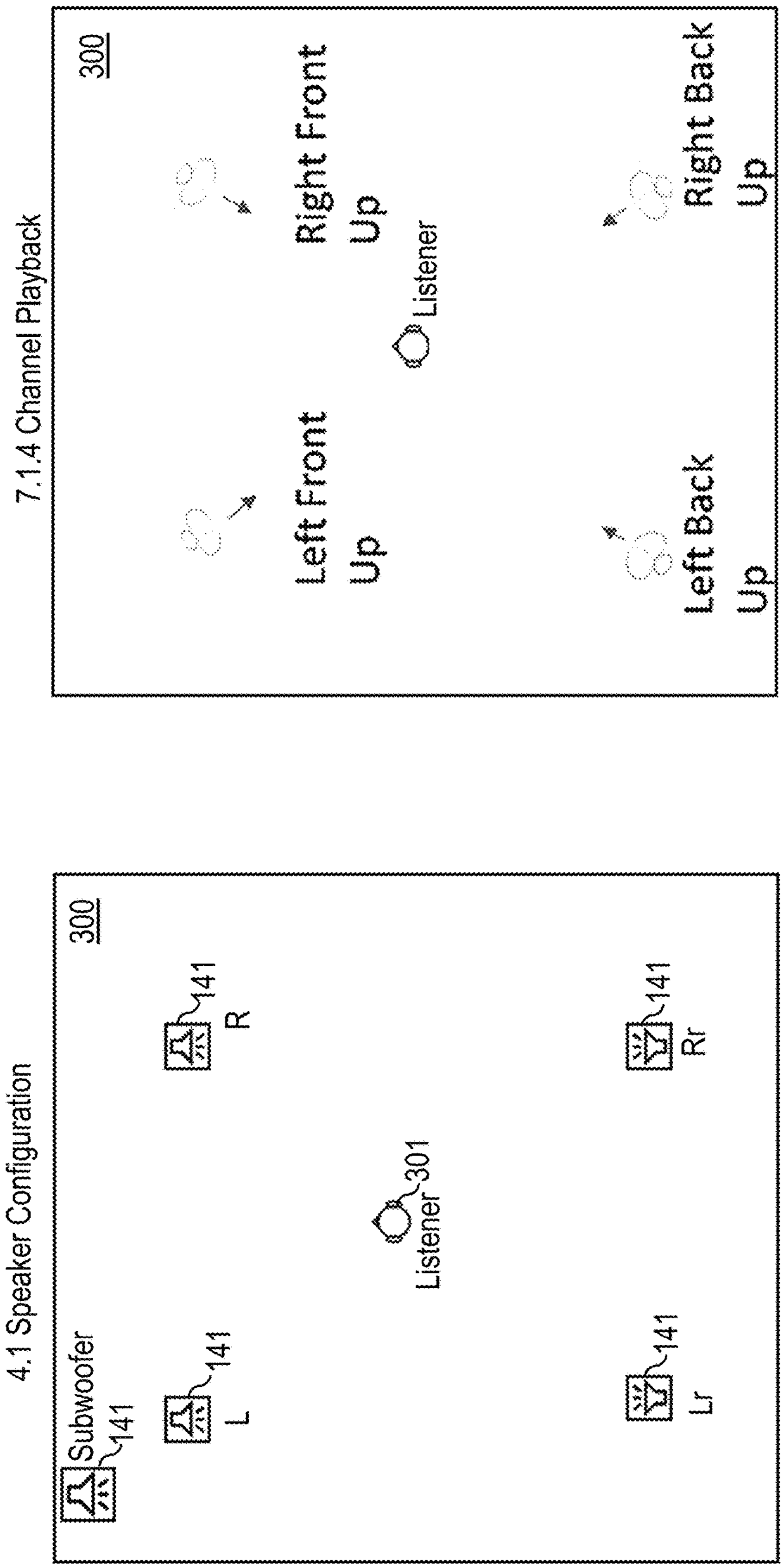
FIG. 6D illustrates a third example set of adjustments to loudspeaker directivity of the loudspeaker system in FIG. 6A to improve 7.1.4 surround sound, in one or more embodiments.

FIG. 6D illustrates a third example set of adjustments to loudspeaker directivity of the loudspeaker system 140 in FIG. 6A to improve 7.1.4 surround sound (i.e., 7.1.4 channel playback), in one or more embodiments. In one embodiment, as shown in FIG. 6D, the automatic loudspeaker directivity adaptation system 200 improves 7.1.4 surround sound (i.e., improves sound's sense of immersion and perceived envelopment in the room 300) by: (1) assigning a left front up channel of the loudspeaker system 140 to the L loudspeaker, (2) assigning a right front up channel of the loudspeaker system 140 to the R loudspeaker, (3) assigning a left back up channel of the loudspeaker system 140 to the Lr loudspeaker, (4) assigning a right back up channel of the loudspeaker system 140 to the Rr loudspeaker, and (5) adapting/adjusting directivity of the L loudspeaker, the R loudspeaker, the Lr loudspeaker, and the Rr loudspeaker to supercardioid directivity pattern, such that acoustic energy reproduced by the L loudspeaker, the R loudspeaker, the Lr loudspeaker, and the Rr loudspeaker are directed towards the listener 301.

Figure 7A:
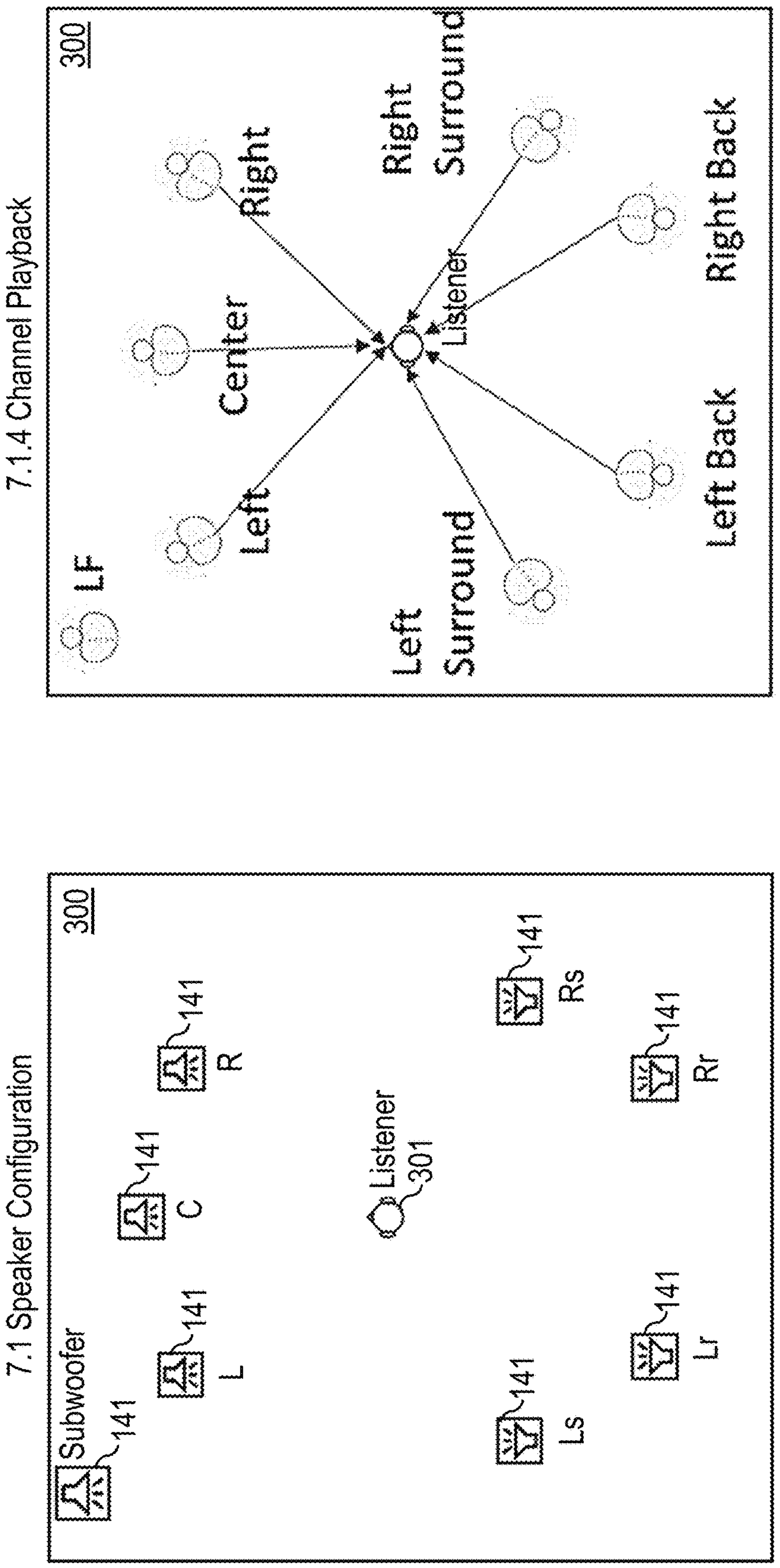
FIG. 7A illustrates an example 7.1 loudspeaker setup for a multichannel audio loudspeaker system in a room, in one or more embodiments.

FIG. 7A illustrates an example 7.1 loudspeaker setup (i.e., speaker configuration) for a multichannel audio loudspeaker system 140 in a room 300, in one or more embodiments. In one embodiment, the loudspeaker system 140 comprises a plurality of loudspeakers 141 arranged around a listener 301 in the room 300. Specifically, the loudspeakers 141 include a L loudspeaker arranged at a front left of the room 300, a C loudspeaker arranged at a front center of the room 300, a R loudspeaker arranged at a front right of the room 300, a Ls loudspeaker arranged at a side left of the room 300, a Lr loudspeaker arranged at a rear left of the room 300, a Rs loudspeaker arranged at a side right of the room 300, a Rr loudspeaker arranged at a rear right of the room 300, and a subwoofer. Initially, the loudspeaker system 140 comprises a left channel, a center channel, a right channel, a left surround channel, a left back channel, a right surround channel, a right back channel, and a low-frequency (LF) channel providing audio reproduced by the L loudspeaker, the C loudspeaker, the R loudspeaker, the Ls loudspeaker, the Lr loudspeaker, the Rs loudspeaker, the Rr loudspeaker, and the subwoofer, respectively. Directivity of the L loudspeaker, the R loudspeaker, and the subwoofer are initially set to supercardioid directivity pattern, as shown in FIG. 7A. Assume the loudspeaker system 140 is capable of providing 7.1.4 surround sound (i.e., 7.1.4 channel playback).

Figure 7B:
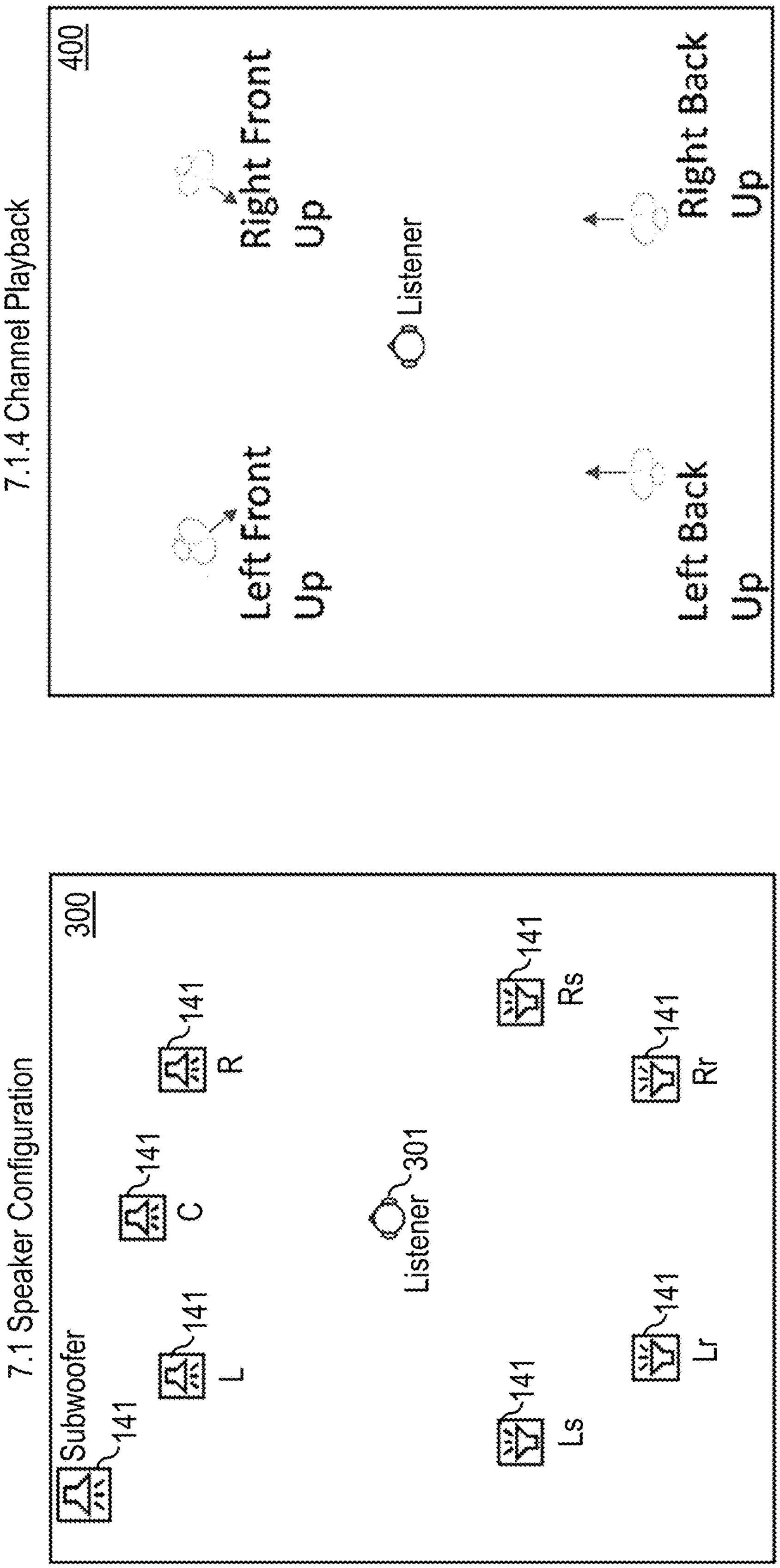
FIG. 7B illustrates an example set of adjustments to loudspeaker directivity of the loudspeaker system in FIG. 7A to improve 7.1.4 surround sound, in one or more embodiments.

FIG. 7B illustrates an example set of adjustments to loudspeaker directivity of the loudspeaker system 140 in FIG. 7A to improve 7.1.4 surround sound (i.e., 7.1.4 channel playback), in one or more embodiments. In one embodiment, as shown in FIG. 7B, the automatic loudspeaker directivity adaptation system 200 improves 7.1.4 surround sound (i.e., improves sound's sense of immersion and perceived envelopment in the room 300) by: (1) assigning a left front up channel of the loudspeaker system 140 to the L loudspeaker, (2) assigning a right front up channel of the loudspeaker system 140 to the R loudspeaker, (3) assigning a left back up channel of the loudspeaker system 140 to the Lr loudspeaker, (4) assigning a right back up channel of the loudspeaker system 140 to the Rr loudspeaker, and (5) adapting/adjusting directivity of the L loudspeaker, the R loudspeaker, the Lr loudspeaker, and the Rr loudspeaker to supercardioid directivity pattern, such that acoustic energy reproduced by the L loudspeaker, the R loudspeaker, the Lr loudspeaker, and the Rr loudspeaker are directed towards the listener 301.

Figure 8A:
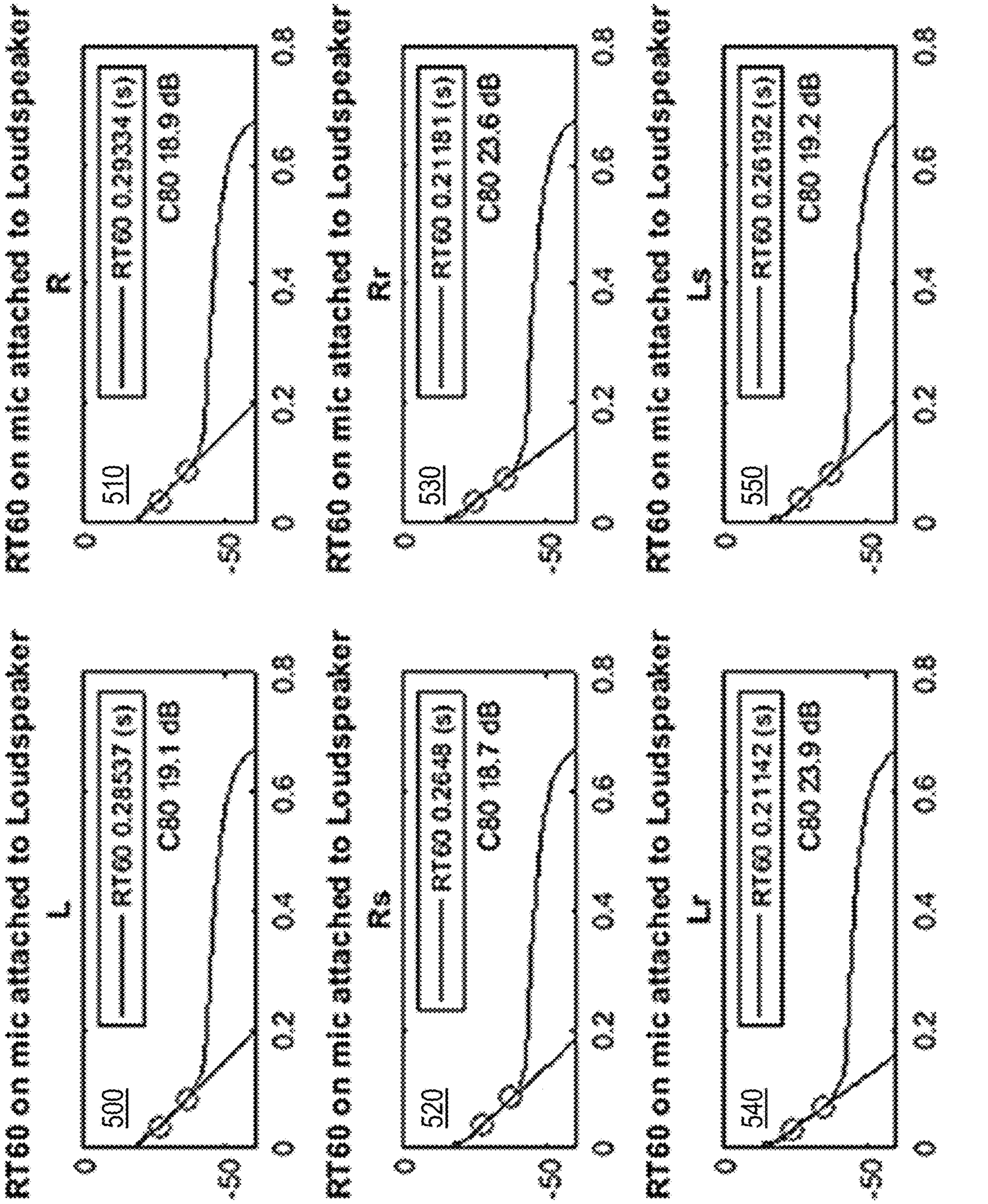
FIG. 8A illustrates examples of different graph plots of room acoustic parameters of the room in FIG. 2A without any adjustments to loudspeaker directivity of the loudspeaker system in the room.

FIG. 8A illustrates examples of different graph plots 500-550 of room acoustic parameters of the room 300 in FIG. 2A without any adjustments to loudspeaker directivity of the loudspeaker system 140 in the room 300. A horizontal axis of each graph plot 500-550 represents time expressed in s. A vertical axis of each graph plot 500-550 represents acoustic energy expressed in dB. As shown in FIG. 2A, a C loudspeaker of the loudspeaker system 140 is used as a source of audio for measuring RIRs, and microphones 143 on a L loudspeaker, a R loudspeaker, a Rs loudspeaker, a Rr loudspeaker, a Lr loudspeaker, and a Ls loudspeaker of the loudspeaker system 140 are used to measure the RIRs.

As shown in FIG. 8A, a first graph plot 500 represents reverberation time $RT_{60}$ and clarity $C_{80}$ based on RIRs measured using at least one microphone 143 on the L loudspeaker, a second graph plot 510 represents reverberation time $RT_{60}$ and clarity $C_{80}$ based on RIRs measured using at least one microphone 143 on the R loudspeaker, a third graph plot 520 represents reverberation time $RT_{60}$ and clarity $C_{80}$ based on RIRs measured using at least one microphone 143 on the Rs loudspeaker, a fourth graph plot 530 represents reverberation time $RT_{60}$ and clarity $C_{80}$ based on RIRs measured using at least one microphone 143 on the Rr loudspeaker, a fifth graph plot 540 represents reverberation time $RT_{60}$ and clarity $C_{80}$ based on RIRs measured using at least one microphone 143 on the Lr loudspeaker, and a sixth graph plot 550 represents reverberation time $RT_{60}$ and clarity $C_{80}$ based on RIRs measured using at least one microphone 143 on the Ls loudspeaker. Without any adjustments to loudspeaker directivity of the loudspeaker system 140, an average reverberation time $RT_{60}$ in the room is 0.25 s, and an average clarity $C_{80}$ in the room 300 is 20.5 dB.

Figure 8B:
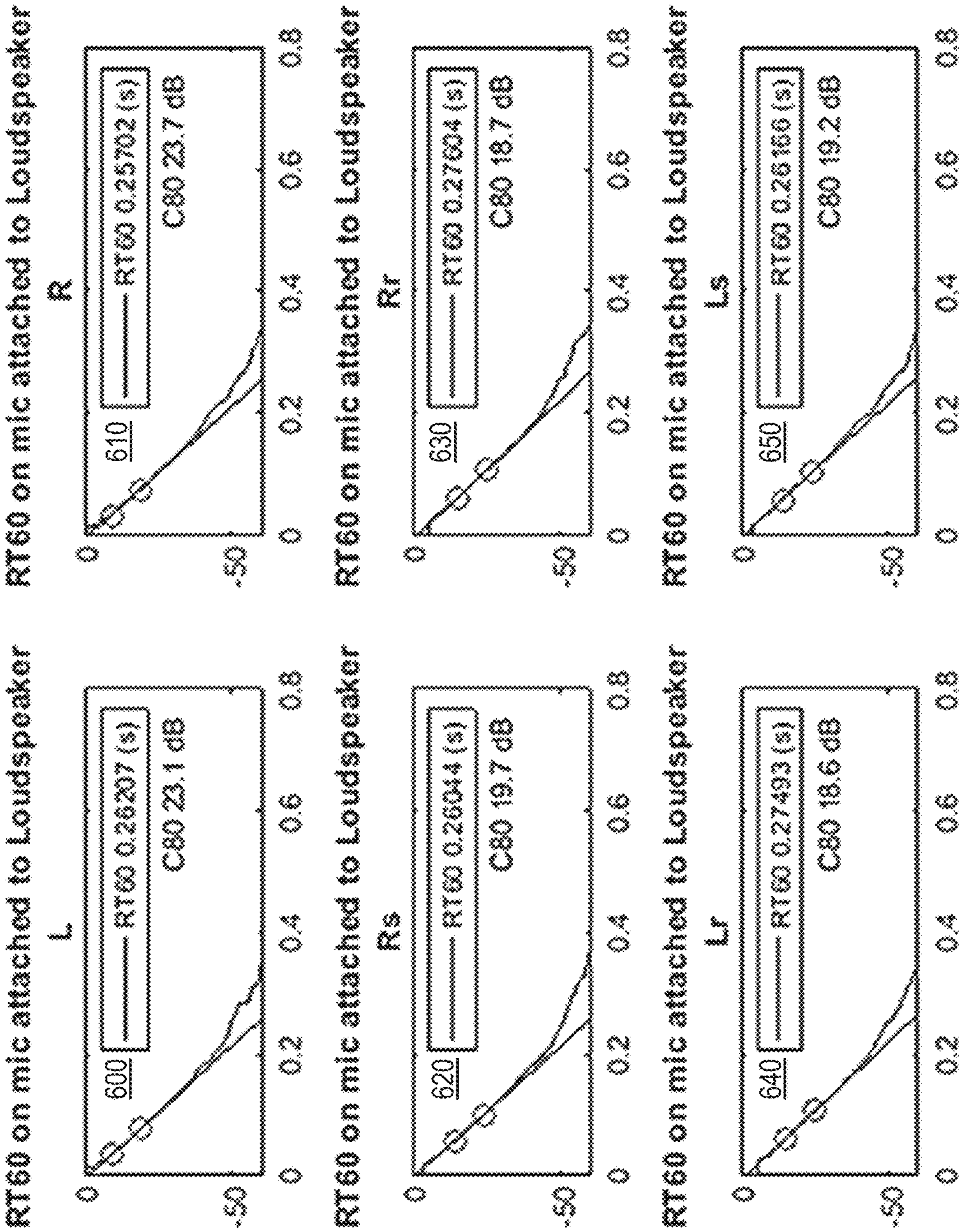
FIG. 8B illustrates examples of different graph plots of room acoustic parameters of the room in FIG. 2A with a first example adjustment to loudspeaker directivity of the loudspeaker system in the room, in one or more embodiments.

FIG. 8B illustrates examples of different graph plots 600-650 of room acoustic parameters of the room 300 in FIG. 2A with a first example adjustment to loudspeaker directivity of the loudspeaker system 140 in the room 300, in one or more embodiments. A horizontal axis of each graph plot 600-650 represents time expressed in s. A vertical axis of each graph plot 600-650 represents acoustic energy expressed in dB. In one embodiment, the automatic loudspeaker directivity adaptation system 200 adapts/adjusts directivity of the C loudspeaker of the loudspeaker system 140 to omnidirectional directivity pattern.

As shown in FIG. 8B, a first graph plot 600 represents reverberation time $RT_{60}$ and clarity $C_{80}$ based on RIRs measured using at least one microphone 143 on the L loudspeaker, a second graph plot 610 represents reverberation time $RT_{60}$ and clarity $C_{80}$ based on RIRs measured using at least one microphone 143 on the R loudspeaker, a third graph plot 620 represents reverberation time $RT_{60}$ and clarity $C_{80}$ based on RIRs measured using at least one microphone 143 on the Rs loudspeaker, a fourth graph plot 630 represents reverberation time $RT_{60}$ and clarity $C_{80}$ based on RIRs measured using at least one microphone 143 on the Rr loudspeaker, a fifth graph plot 640 represents reverberation time $RT_{60}$ and clarity $C_{80}$ based on RIRs measured using at least one microphone 143 on the Lr loudspeaker, and a sixth graph plot 650 represents reverberation time $RT_{60}$ and clarity $C_{80}$ based on RIRs measured using at least one microphone 143 on the Ls loudspeaker. With the directivity of the C loudspeaker of the loudspeaker system 140 adapted/adjusted to omnidirectional directivity pattern, an average reverberation time $RT_{60}$ in the room is 0.26 s, and an average clarity $C_{80}$ in the room 300 is 20.5 dB.

Figure 8C:
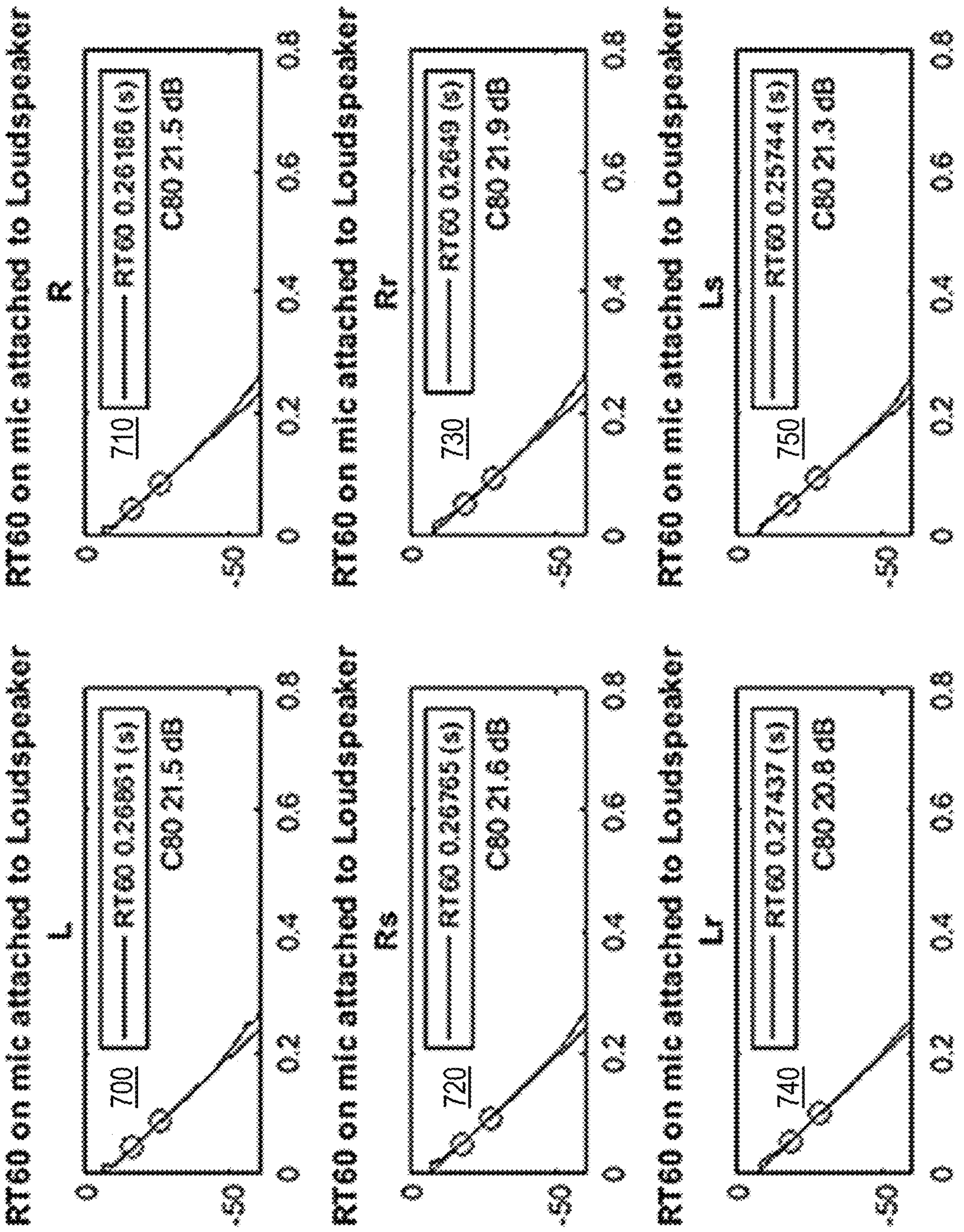
FIG. 8C illustrates examples of different graph plots of room acoustic parameters of the room in FIG. 2A with a second example adjustment to loudspeaker directivity of the loudspeaker system in the room, in one or more embodiments.

FIG. 8C illustrates examples of different graph plots 700-750 of room acoustic parameters of the room 300 in FIG. 2A with a second example adjustment to loudspeaker directivity of the loudspeaker system 140 in the room 300, in one or more embodiments. A horizontal axis of each graph plot 700-750 represents time expressed in s. A vertical axis of each graph plot 700-750 represents acoustic energy expressed in dB. In one embodiment, the automatic loudspeaker directivity adaptation system 200 adapts/adjusts directivity of the C loudspeaker of the loudspeaker system 140 to hypercardioid directivity pattern.

As shown in FIG. 8C, a first graph plot 700 represents reverberation time $RT_{60}$ and clarity $C_{80}$ based on RIRs measured using at least one microphone 143 on the L loudspeaker, a second graph plot 710 represents reverberation time $RT_{60}$ and clarity $C_{80}$ based on RIRs measured using at least one microphone 143 on the R loudspeaker, a third graph plot 720 represents reverberation time $RT_{60}$ and clarity $C_{80}$ based on RIRs measured using at least one microphone 143 on the Rs loudspeaker, a fourth graph plot 730 represents reverberation time $RT_{60}$ and clarity $C_{80}$ based on RIRs measured using at least one microphone 143 on the Rr loudspeaker, a fifth graph plot 740 represents reverberation time $RT_{60}$ and clarity $C_{80}$ based on RIRs measured using at least one microphone 143 on the Lr loudspeaker, and a sixth graph plot 750 represents reverberation time $RT_{60}$ and clarity $C_{80}$ based on RIRs measured using at least one microphone 143 on the Ls loudspeaker. With the directivity of the C loudspeaker of the loudspeaker system 140 adapted/adjusted to hypercardioid directivity pattern, an average reverberation time $RT_{60}$ in the room is 0.26 s, and an average clarity $C_{80}$ in the room 300 is 21.4 dB.

The average clarity $C_{80}$ in the room 300 is higher when the directivity of the C loudspeaker is adapted/adjusted to hypercardioid directivity pattern instead of omnidirectional directivity pattern. Thus, there is better sound quality (i.e., sound will be perceived more clearly by a listener in the room 300) when the C loudspeaker is more directive (e.g., directivity of the C loudspeaker is adapted/adjusted to hypercardioid directivity pattern instead of omnidirectional directivity pattern). A more directive loudspeaker 141 (e.g., hypercardioid directivity pattern, subcardioid directivity pattern) is suitable if content type of audio to be reproduced by the loudspeaker 141 is speech. By comparison, a less directive loudspeaker 141 (e.g., cardioid directivity pattern) is suitable if content type of audio to be reproduced by the loudspeaker 141 is music instead.

Figure 9:
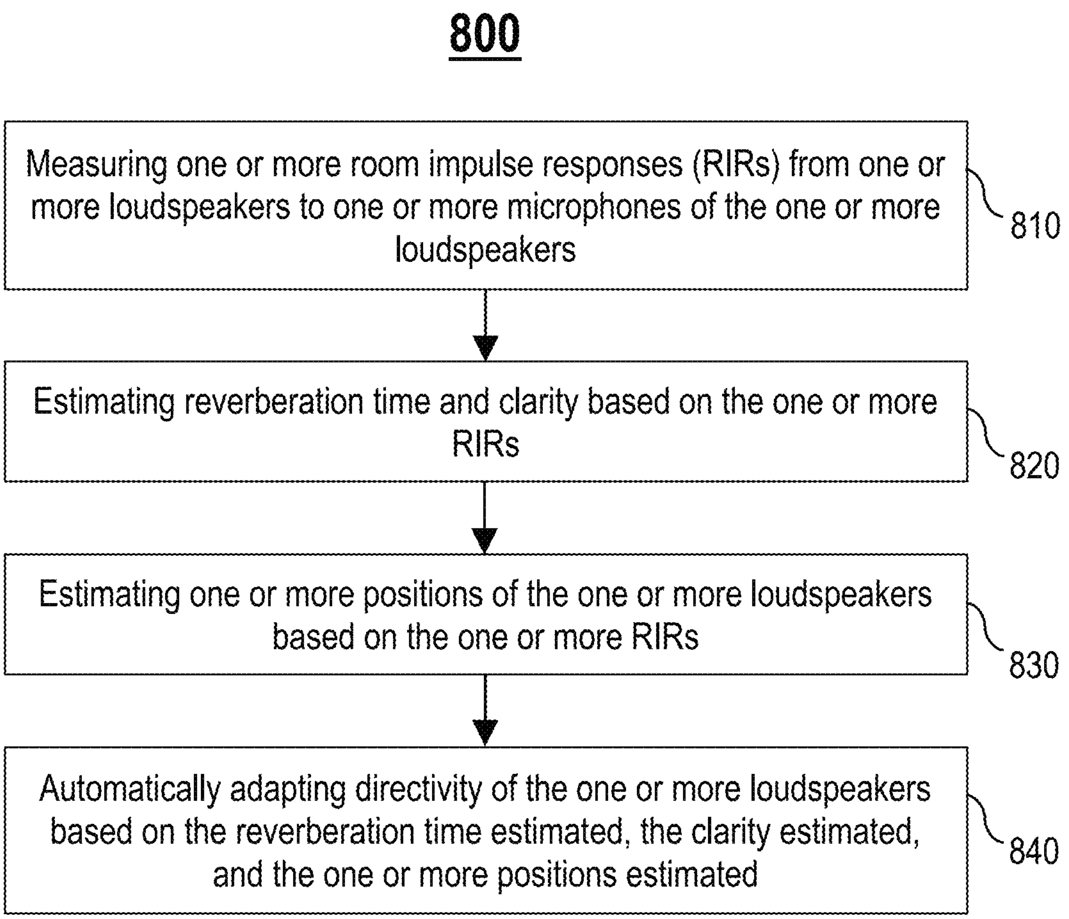
FIG. 9 is a flowchart of an example process for automatic loudspeaker directivity adaptation, in one or more embodiments.

FIG. 9 is a flowchart of an example process 800 for automatic loudspeaker directivity adaptation, in one or more embodiments. Process block 810 includes measuring one or more room RIRs from one or more loudspeakers to one or more microphones of the one or more loudspeakers. Process block 820 includes estimating reverberation time and clarity based on the one or more RIRs. Process block 830 includes estimating one or more positions of the one or more loudspeakers based on the one or more RIRs. Process block 840 includes automatically adapting directivity of the one or more loudspeakers based on the reverberation time estimated, the clarity estimated, and the one or more positions estimated.

In one embodiment, process blocks 810-840 may be performed by one or more components of the automatic loudspeaker directivity adaptation system 200.

Figure 10:
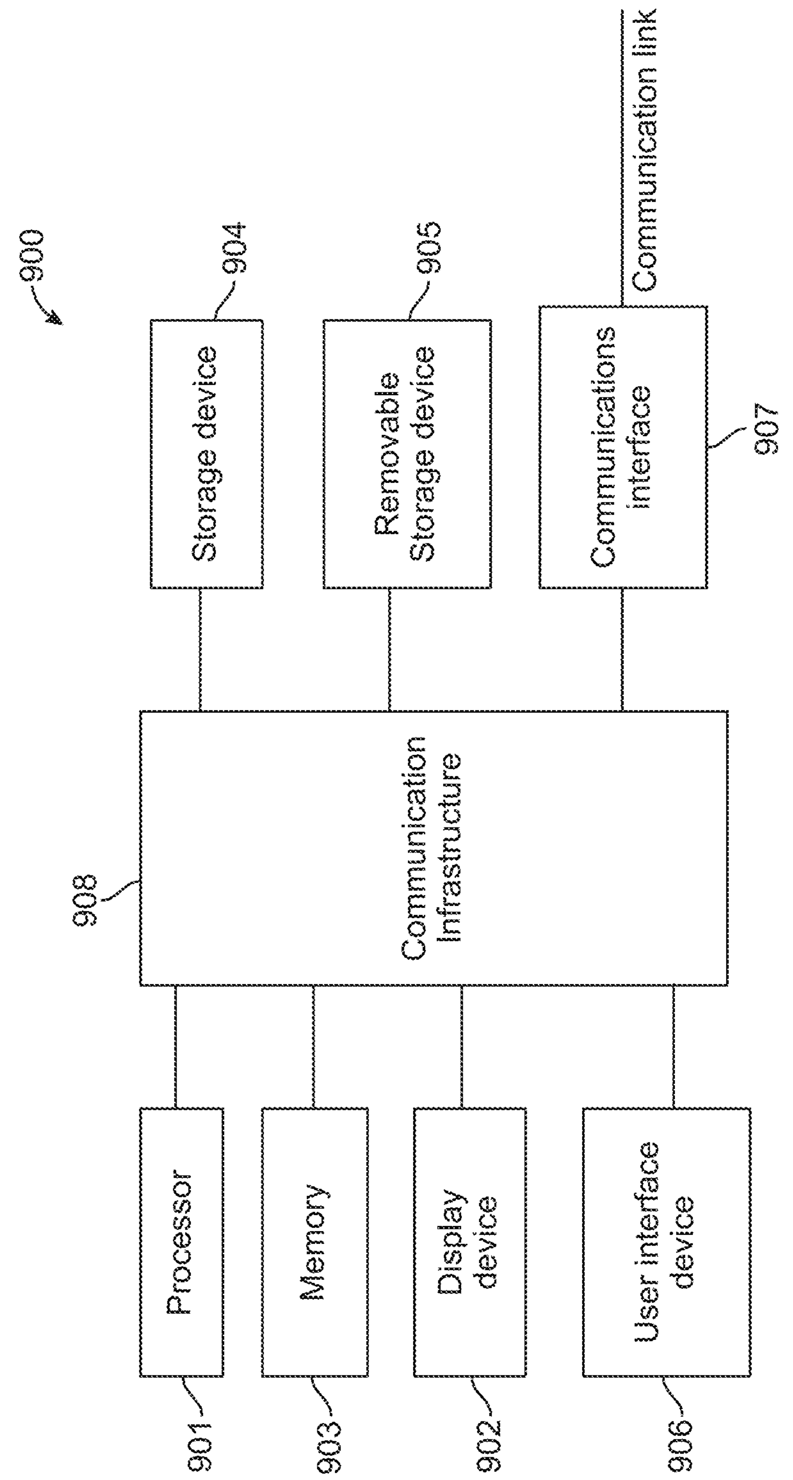
FIG. 10 is a high-level block diagram showing an information processing system comprising a computer system useful for implementing the disclosed embodiments.

FIG. 10 is a high-level block diagram showing an information processing system comprising a computer system 900 useful for implementing the disclosed embodiments. The systems 120, 200, and 300 may be incorporated in the computer system 900. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 350 (FIG. 3B) and/or process 800 (FIG. 9) may be stored as program instructions on the memory 903, storage device 904, and/or the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method of automatic loudspeaker directivity adaptation, comprising:

measuring one or more room impulse responses (RIRs) from one or more loudspeakers to one or more microphones of the one or more loudspeakers;

estimating reverberation time and clarity based on the one or more RIRs;

estimating one or more positions of the one or more loudspeakers based on the one or more RIRs;

assigning at least one channel for the one or more loudspeakers; and automatically adapting directivity of the one or more loudspeakers based on the at least one assigned channel, the reverberation time estimated, the clarity estimated, and the one or more positions estimated, wherein automatically adapting the directivity comprises applying digital signal processing (DSP) to input audio corresponding to the at least one assigned channel using pre-defined filter coefficients selected based on a content type of the input audio and the one or more positions estimated, the directivity is adapted to a recommended directivity pattern to direct acoustic energy based on the content type, and the pre-defined filter coefficients are retrieved from a database storing a plurality of filter coefficient sets.

2. The method of claim 1, wherein:

a plurality of recommended directivity patterns for different content type are used for updating directivity for automatically adapting directivity for the one or more loudspeakers;

the directivity of the one or more loudspeakers is adapted to direct acoustic energy reproduced by the one or more loudspeakers towards at least one of a ceiling, a wall, a floor, or a listener;

the plurality of recommended directivity patterns are stored in the database and selected based on the content type of the input audio, the content type comprising one of speech or music;

the directivity is adapted to a more directive pattern for speech and a less directive pattern for music; and each set associated with a specific combination of content type, estimated loudspeaker position, reverberation time, and clarity.

3. The method of claim 2, wherein:

pre-defined filter coefficients are used for updating directivity for automatically adapting directivity for the one or more loudspeakers; and estimating one or more positions of the one or more loudspeakers based on the one or more RIRs comprises:

estimating one or more distances from the one or more loudspeakers to a boundary nearest to the one or more loudspeakers, wherein the boundary is one of a ceiling, a wall, or a floor;

estimating one or more orientations of the one or more loudspeakers relative to the boundary nearest to the one or more loudspeakers; and the recommended directivity pattern is selected to optimize acoustic energy direction toward at least one of a ceiling, a wall, a floor, or a listener based on the content type comprising one of speech or music.

4. The method of claim 1, further comprising:

providing directivity information to a multi-channel loudspeaker amplifier based on the at least one assigned channel;

wherein the directivity of the one or more loudspeakers is adapted to one of a omnidirectional directivity pattern, a subcardioid directivity pattern, a cardioid directivity pattern, a supercardioid directivity pattern, or a hypercardioid directivity pattern, the directivity information is based on the pre-defined filter coefficients selected according to the content type of the input audio and the estimated positions of the one or more loudspeakers.

5. The method of claim 1, wherein each of the one or more loudspeakers comprises one microphone, the database includes pre-defined filter coefficient sets indexed by content type and estimated loudspeaker position, and the selection of the recommended directivity pattern accounts for the estimated reverberation time and clarity to minimize undesirable acoustic reflections for speech or enhance diffuse sound for music.

6. The method of claim 1, wherein each of the one or more loudspeakers comprises a microphone array.

7. The method of claim 6, further comprising:

determining a direction of a direct sound and a first order reflection utilizing each microphone array of each of the one or more loudspeakers and an intensity vector calculation.

8. A system of automatic loudspeaker directivity adaptation, comprising:

at least one processor; and a non-transitory processor-readable memory device storing instructions that when executed by the at least one processor causes the at least one processor to perform operations including:

measuring one or more room impulse responses (RIRs) from one or more loudspeakers to one or more microphones of the one or more loudspeakers;

estimating reverberation time and clarity based on the one or more RIRs;

estimating one or more positions of the one or more loudspeakers based on the one or more RIRs;

assigning at least one channel for the one or more loudspeakers; and automatically adapting directivity of the one or more loudspeakers based on the at least one assigned channel, the reverberation time estimated, the clarity estimated, and the one or more positions estimated, wherein automatically adapting the directivity comprises applying digital signal processing (DSP) to input audio corresponding to the at least one assigned channel using pre-defined filter coefficients selected based on a content type of the input audio and the one or more positions estimated, the directivity is adapted to a recommended directivity pattern to direct acoustic energy based on the content type, and the pre-defined filter coefficients are retrieved from a database storing a plurality of filter coefficient sets.

9. The system of claim 8, wherein:

recommended directivity patterns for different content type are used for updating directivity for automatically adapting directivity for the one or more loudspeakers;

the directivity of the one or more loudspeakers is adapted to direct acoustic energy reproduced by the one or more loudspeakers towards at least one of a ceiling, a wall, a floor, or a listener;

the plurality of recommended directivity patterns are stored in the database and selected based on the content type of the input audio, the content type comprising one of speech or music;

the directivity is adapted to a more directive pattern for speech and a less directive pattern for music; and each set associated with a specific combination of content type, estimated loudspeaker position, reverberation time, and clarity.

10. The system of claim 9, wherein:

pre-defined filter coefficients are used for updating directivity for automatically adapting directivity for the one or more loudspeakers; and estimating one or more positions of the one or more loudspeakers based on the one or more RIRs comprises:

estimating one or more distances from the one or more loudspeakers to a boundary nearest to the one or more loudspeakers, wherein the boundary is one of a ceiling, a wall, or a floor;

estimating one or more orientations of the one or more loudspeakers relative to the boundary nearest to the one or more loudspeakers; and the recommended directivity pattern is selected to optimize acoustic energy direction toward at least one of a ceiling, a wall, a floor, or a listener based on the content type comprising one of speech or music.

11. The system of claim 8, further comprising:

providing directivity information to a multi-channel loudspeaker amplifier based on the at least one assigned channel;

wherein the directivity of the one or more loudspeakers is adapted to one of a omnidirectional directivity pattern, a subcardioid directivity pattern, a cardioid directivity pattern, a supercardioid directivity pattern, or a hypercardioid directivity pattern, the directivity information is based on the pre-defined filter coefficients selected according to the content type of the input audio and the estimated positions of the one or more loudspeakers.

12. The system of claim 8, wherein each of the one or more loudspeakers comprises one microphone, the database includes pre-defined filter coefficient sets indexed by content type and estimated loudspeaker position, and the selection of the recommended directivity pattern accounts for the estimated reverberation time and clarity to minimize undesirable acoustic reflections for speech or enhance diffuse sound for music.

13. The system of claim 8, wherein each of the one or more loudspeakers comprises a microphone array.

14. The system of claim 13, wherein the operations further include:

determining a direction of a direct sound and a first order reflection utilizing each microphone array of each of the one or more loudspeakers and an intensity vector calculation.

15. A non-transitory processor-readable medium that includes a program that when executed by a processor performs a method of automatic loudspeaker directivity adaptation, the method comprising:

measuring one or more room impulse responses (RIRs) from one or more loudspeakers to one or more microphones of the one or more loudspeakers;

estimating reverberation time and clarity based on the one or more RIRs;

estimating one or more positions of the one or more loudspeakers based on the one or more RIRs;

assigning at least one channel for the one or more loudspeakers; and automatically adapting directivity of the one or more loudspeakers based on the at least one assigned channel, the reverberation time estimated, the clarity estimated, and the one or more positions estimated, wherein automatically adapting the directivity comprises applying digital signal processing (DSP) to input audio corresponding to the at least one assigned channel using pre-defined filter coefficients selected based on a content type of the input audio and the one or more positions estimated, the directivity is adapted to a recommended directivity pattern to direct acoustic energy based on the content type, and the pre-defined filter coefficients are retrieved from a database storing a plurality of filter coefficient sets.

16. The non-transitory processor-readable medium of claim 15, wherein:

recommended directivity patterns for different content type are used for updating directivity for automatically adapting directivity for the one or more loudspeakers;

the directivity of the one or more loudspeakers is adapted to direct acoustic energy reproduced by the one or more loudspeakers towards at least one of a ceiling, a wall, a floor, or a listener;

the plurality of recommended directivity patterns are stored in the database and selected based on the content type of the input audio, the content type comprising one of speech or music;

the directivity is adapted to a more directive pattern for speech and a less directive pattern for music; and each set associated with a specific combination of content type, estimated loudspeaker position, reverberation time, and clarity.

17. The non-transitory processor-readable medium of claim 16, wherein:

pre-defined filter coefficients are used for updating directivity for automatically adapting directivity for the one or more loudspeakers; and estimating one or more positions of the one or more loudspeakers based on the one or more RIRs comprises:

estimating one or more distances from the one or more loudspeakers to a boundary nearest to the one or more loudspeakers, wherein the boundary is one of a ceiling, a wall, or a floor;

estimating one or more orientations of the one or more loudspeakers relative to the boundary nearest to the one or more loudspeakers; and the recommended directivity pattern is selected to optimize acoustic energy direction toward at least one of a ceiling, a wall, a floor, or a listener based on the content type comprising one of speech or music.

18. The non-transitory processor-readable medium of claim 15, further comprising:

providing directivity information to a multi-channel loudspeaker amplifier based on the at least one assigned channel;

wherein the directivity of the one or more loudspeakers is adapted to one of a omnidirectional directivity pattern, a subcardioid directivity pattern, a cardioid directivity pattern, a supercardioid directivity pattern, or a hypercardioid directivity pattern, the directivity information is based on the pre-defined filter coefficients selected according to the content type of the input audio and the estimated positions of the one or more loudspeakers.

19. The non-transitory processor-readable medium of claim 15, wherein each of the one or more loudspeakers comprises one microphone, the database includes pre-defined filter coefficient sets indexed by content type and estimated loudspeaker position, and the selection of the recommended directivity pattern accounts for the estimated reverberation time and clarity to minimize undesirable acoustic reflections for speech or enhance diffuse sound for music.

20. The non-transitory processor-readable medium of claim 15, wherein each of the one or more loudspeakers comprises a microphone array.

* * * * *